(12) United States Patent
Papineau et al.

(10) Patent No.: US 8,213,971 B2
(45) Date of Patent: Jul. 3, 2012

(54) APPARATUS AND METHOD FOR ACTIVATING COMPUTER APPLICATIONS WITH SMS MESSAGING

(75) Inventors: Scott A. Papineau, San Diego, CA (US); Stephen A. Sprigg, Poway, CA (US); Clifton Scott, San Diego, CA (US); James R. Pyers, Escondido, CA (US); Mahesh Moorthy, San Diego, CA (US); Theodore C. Walker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 12/430,642

(22) Filed: Apr. 27, 2009

(65) Prior Publication Data

US 2010/0273450 A1  Oct. 28, 2010

(51) Int. Cl.
| | |
|---|---|
| *H04W 4/00* | (2009.01) |
| *H04M 1/66* | (2006.01) |
| *H04M 1/68* | (2006.01) |
| *H04M 3/16* | (2006.01) |
| *H04M 3/42* | (2006.01) |
| *H04M 3/00* | (2006.01) |
| *G06F 15/16* | (2006.01) |
| *G06F 15/177* | (2006.01) |
| *G06F 9/00* | (2006.01) |
| *G06F 9/24* | (2006.01) |
| *G06F 1/00* | (2006.01) |
| *G06F 1/26* | (2006.01) |
| *G06F 1/32* | (2006.01) |

(52) U.S. Cl. ............ 455/466; 455/411; 455/414.1; 455/418; 709/206; 709/222; 713/1; 713/2; 713/310; 713/320

(58) Field of Classification Search .......... 455/411, 455/414.1, 418, 466; 709/206, 222, 217, 709/227; 710/14; 713/1, 2, 310, 320; 340/426.2
See application file for complete search history.

(56) References Cited

U.S. PATENT DOCUMENTS 6,078,820 A * 6/2000 Wells et al. ............ 455/466
(Continued)

FOREIGN PATENT DOCUMENTS

EP    0917038    5/1999
(Continued)

OTHER PUBLICATIONS

Mishra, N. et al, "Wake-On-WLAN"; International World Wide Web Conferenece; Edinboro, Scotland, May 23-26, 2006; pp. 761-769 (citations highlighted).*
International Search Report and Written Opinion—PCT/US2010/032417, International Search Authority—European Patent Office—Sep. 6, 2010.

*Primary Examiner* — Dwayne Bost
*Assistant Examiner* — Larry Sternbane
(74) *Attorney, Agent, or Firm* — James T. Hagler

(57) ABSTRACT

A method and system for remote activation of computer based applications uses Simple Message Service (SMS) messages to inform a remote computer that an application should be activated. The SMS message may be sent by a cell phone or from a computer. The remote computer receives the SMS message, parses the message to determine the application to be started, and starts the indicated application. If the remote computer is turned off, the SMS message can be received by an SMS receiver within a modem which can be configured to start the computer so the application can be activated.

20 Claims, 26 Drawing Sheets

U.S. PATENT DOCUMENTS

| | | | |
|---|---|---|---|
| 7,200,387 B1 * | 4/2007 | Ephraim et al. | 455/418 |
| 7,296,156 B2 * | 11/2007 | Marmigere et al. | 713/170 |
| 7,603,697 B1 * | 10/2009 | Kupsh et al. | 726/2 |
| 2005/0070251 A1 * | 3/2005 | Satake et al. | 455/411 |
| 2005/0166077 A1 * | 7/2005 | Reisacher | 713/320 |
| 2006/0224681 A1 * | 10/2006 | Wurster | 709/206 |
| 2009/0247132 A1 * | 10/2009 | Sumcad et al. | 455/412.1 |

FOREIGN PATENT DOCUMENTS

| | | |
|---|---|---|
| EP | 1557742 | 7/2005 |
| EP | 1587333 | 10/2005 |
| FR | 2852118 | 9/2004 |
| WO | WO0232171 | 4/2002 |

* cited by examiner

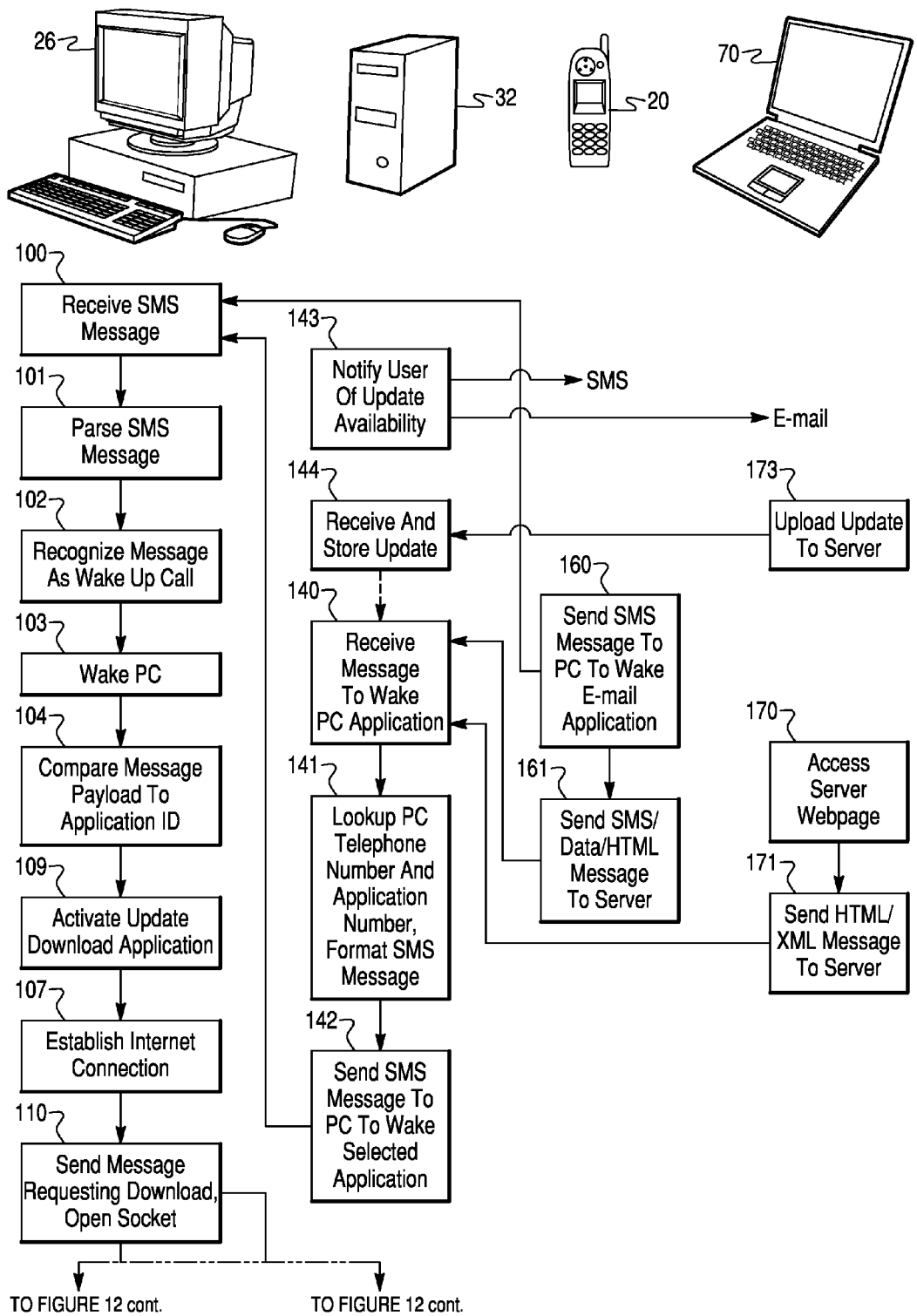

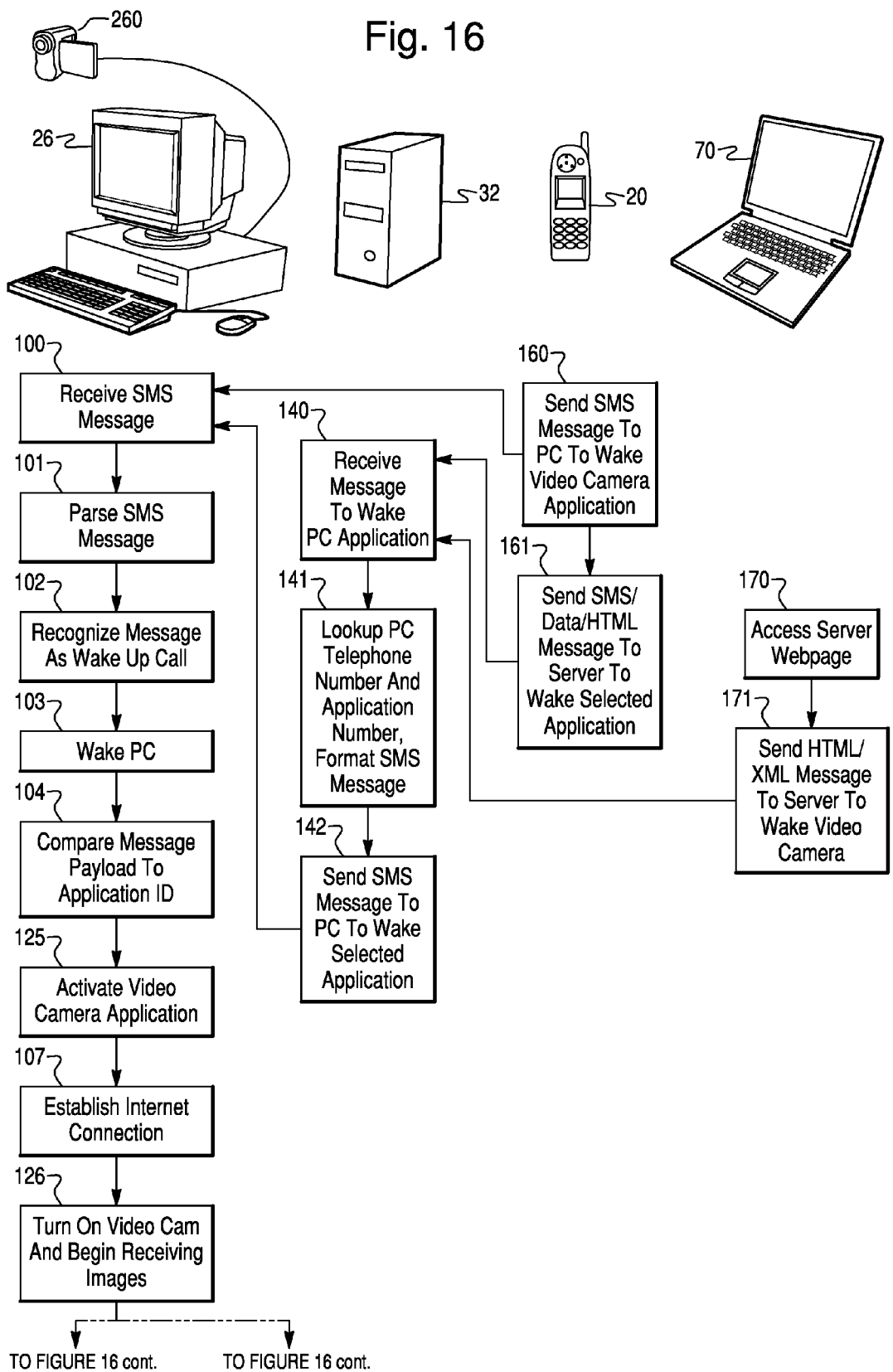

APPARATUS AND METHOD FOR ACTIVATING COMPUTER APPLICATIONS WITH SMS MESSAGING

FIELD OF THE INVENTION

The present invention relates to the field of computer control by remote users, and more particularly to activating computer applications by SMS messaging.

BACKGROUND

Presently, in order to access a personal computer from a remote location, the computer must be operating and actively connected to a network, such as the Internet. Similarly, if a computer application is to be available remotely, the computer must remain powered on and the application operating in standby until called for, even if the application is used infrequently. Also, if a computer data file is to be remotely accessed, the computer must remain powered on and a remote file access program left running. For infrequently used applications or data files this represents an inefficient use of computer resources, and unnecessary network utilization.

SUMMARY OF THE INVENTION

The various embodiments provide systems and methods by which a computer, such as a personal computer, and applications running on the computer can be activated remotely by sending a Short Message Service (SMS) message via a cellular telephone network. An SMS message can be sent from a cell phone to the remote computer to cause a designated application on the remote computer, or the computer itself, to be activated, including turning on the remote computer if necessary. An SMS message may also be sent by a server coupled to a cellular telephone network in response to messages sent to the server from a cell phone or computer connected to a network such as the Internet. When the SMS message is received by the computer, or by the computer's modem, the message is interpreted to determine whether the computer should be started and which application should be activated. By remotely activating applications, a variety of actions can be taken. For example, data files can be transferred to or from the computer, or the computer can be directed to take actions such as determining and reporting its position using a GPS sensor, deleting or encrypting files, or downloading electronic mail.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
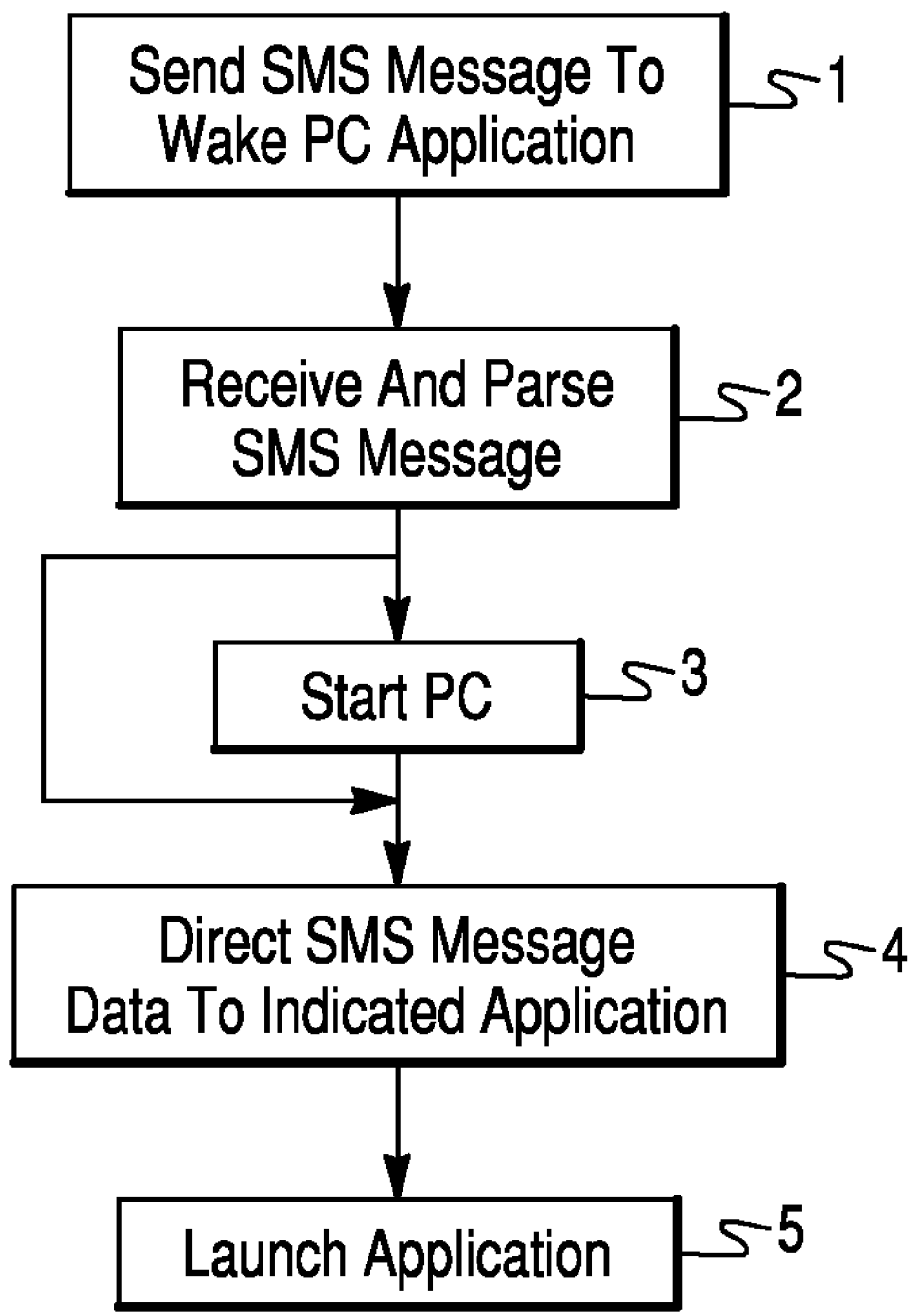
FIG. 1 is a top level flow diagram of an embodiment.

The various embodiments will be described in detail with reference to the accompanying drawings. Wherever possible, the same reference numbers will be used throughout the drawings to refer to the same or like parts. References made herein and in the drawings to "computer," "laptop," "laptop computer" and "PC" are for illustrative purposes and are not intended to limit the scope of the invention or the claims to a particular make, model or configuration of computer. Thus, references to "computer" may encompass laptop computers as well as desktop computers, and references to "laptop computers" may encompass desktop computers.

When a computer, such as a personal computer, is turned off or a desired application is not running, there is little that a remote user can do to access data files, applications or the computer in most circumstances. A computer can be left running and coupled to a network (e.g., the Internet) in order to provide remote users with access to the machine, its applications, or data files stored therein. However, doing so can be an inefficient use of computer resources, and an unnecessary use of network resources and telecommunications expense. In many everyday circumstances, leaving a computer running and connected to the Internet on the off chance that an application may need to be accessed is simply not practical. However, when a computer is disconnected from a network and/or shut down, there is no practical way for a remote user to turn on the computer or activate a particular application other than to have someone physically access the machine.

To overcome this problem, the various embodiments provide mechanisms by which a computer can receive a Short Message Service (SMS) message sent wirelessly via a cellular telephone network that contains instructions for turning on the computer and/or activating an application that is not presently running. SMS is a service for sending messages of up to 160 characters (224 characters if using a 5-bit mode) to mobile phones over a cellular telephone network. SMS is similar to paging, however, SMS messages do not require the mobile phone to be active and within range since message will be held in memory storage for a number of days until the phone is active and within range at which time the message will be sent.

Referring to FIG. 1 which provides an overview of the process of the various embodiments, a user initiates remote activation of a computer application by sending an SMS message to activate (i.e., "wake up") the application and, if necessary, the computer itself, step 1. This SMS message may be sent from a cell phone by composing a simple text message. Alternatively, the SMS message can be sent by sending a message to a server coupled to the cellular telephone network, such as by accessing a webpage hosted by the server and requesting that an SMS message be sent to the computer. The SMS message is received by a specially configured modem within or coupled to the computer, which parses the message to determine the application that is to the started and unpack information to be used by the application, step 2. If the computer is presently off, the modem can generate a start signal to cause the computer to start and initiate its boot sequence, step 3. If the computer is already running, or after the computer completes its boot up processes, the operating system initiates the application and the SMS message data is directed to the indicated application, step 4. Finally, the indicated application is launched making use of data that may have been included in the SMS message payload, step 5.

Using SMS message capabilities to transmit a request to start up a computer application and, if necessary, the computer itself provides a number of advantages. SMS messages are transmitted wirelessly via the cellular telephone network so the computer does not need to be coupled to an active network or the Internet to receive the message. The SMS message is completely asynchronous and does not require an open communication link, IP address or other continuous communication infrastructure as is the case with standard wireless data networks. SMS messages will be rebroadcast for a number of days until delivery is finally achieved, thereby providing a reliable mechanism for communicating with computers that may be mobile. The various embodiments generally make use of the cellular telephone network infrastructure that already exists so the embodiments can be deployed without significant expense. The SMS receiver can be borrowed from cellular telephone chipsets which have been optimized for low power consumption. This allows modem designs that provide the SMS receiver with battery power so the circuit can continue to run even when the rest of the computer has been turned off. Finally, the SMS message provides a convenient way for users to remotely control a computer using only a cellular telephone or similar mobile handset (e.g., PDA, Blackberry®, etc.).

Figure 2:
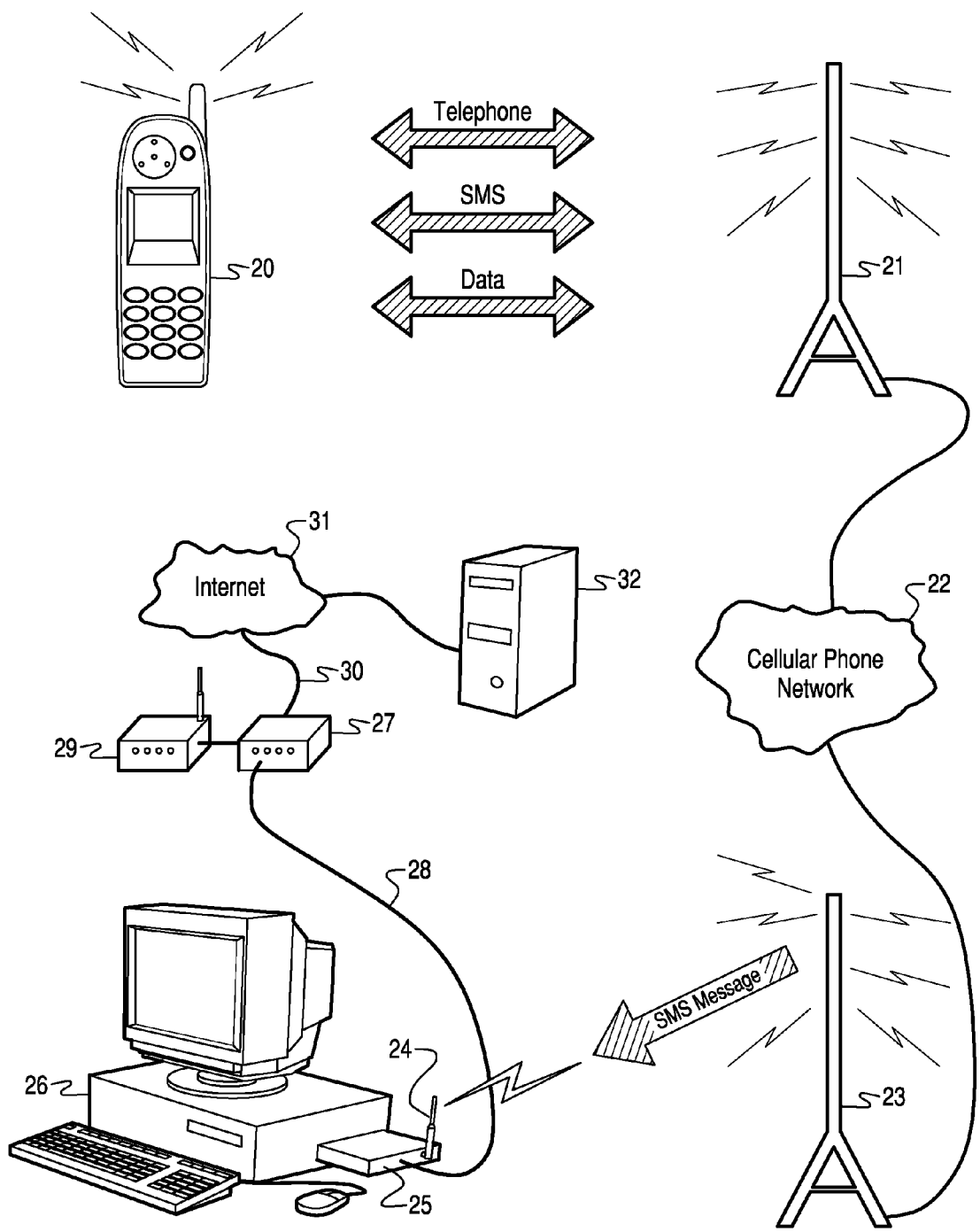
FIG. 2 is a system diagram of an embodiment.

An example of a typical system and implementation of an embodiment is illustrated in FIG. 2. In this system architecture, a cellular telephone 20 communicates with the cellular telephone network 22 through the nearest cellular telephone tower 21. As is well known, modern cellular telephones can send and receive telephone calls, SMS messages, electronic mail, and data packets, such as Internet web page data. Such data travels wirelessly between the cellular telephone 20 and a cell tower 21, but is generally carried over the conventional telephone network and other data networks to its intended receiver. If the intended receiver is another wireless cellular telephone, the data will travel from the cellular telephone 20 to a cell tower 21 within range of the cellular telephone 20 and then generally through a conventional telephone network until it reaches another cell tower 23 within range of the intended receiver, at which point the data travels wirelessly to the intended receiver. In the case of the various embodiments, the intended receiver is a wireless modem 25 coupled to or integrated within a computer 26. In the various embodiments, the modem 25 includes an SMS receiver circuit 52 (shown in FIG. 5A) that can receive SMS messages from the local cell tower 23 via the modem's antenna 24. In a typical implementation, the computer modem 25 enables the computer 26 to communicate with an Internet access point such as a network router 27 by a cable (such as an Ethernet cable 28) and/or by wireless data link to a wireless router 29, such as a WiFi base station. The network router 27 is frequently coupled by a wired connection 30 to the Internet 31, such as a telephone wire (e.g., DSL service), a coaxial cable (e.g., cable Internet service), or fiber optic line (e.g., Verizon's FiOS Internet service). By accessing the Internet 31, the computer may make data connections to other computers, such as a server 32 coupled to the Internet 31 and to the cellular telephone network 22.

Figure 3:
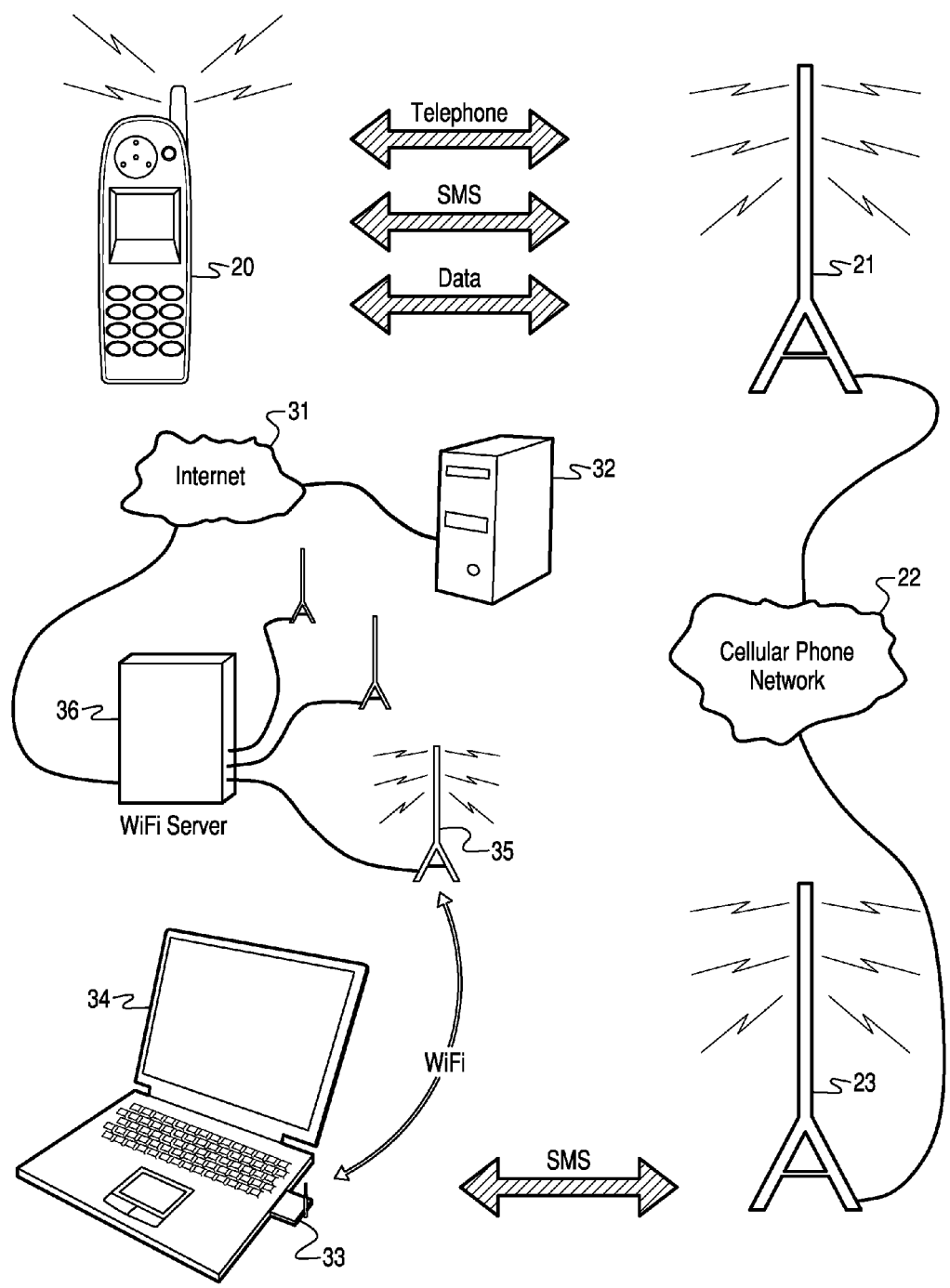
FIG. 3 is an alternative system embodiment.
Figure 5A:
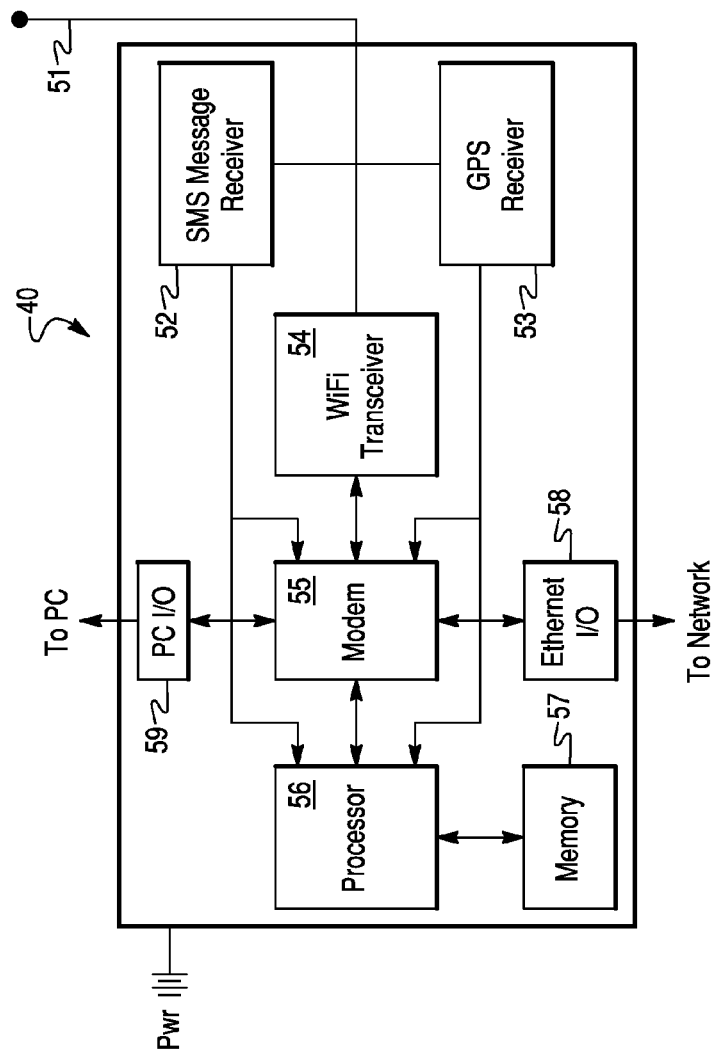
FIGS. 5A and 5B are system block diagrams of a modem card according to two embodiments.
Figure 5B:
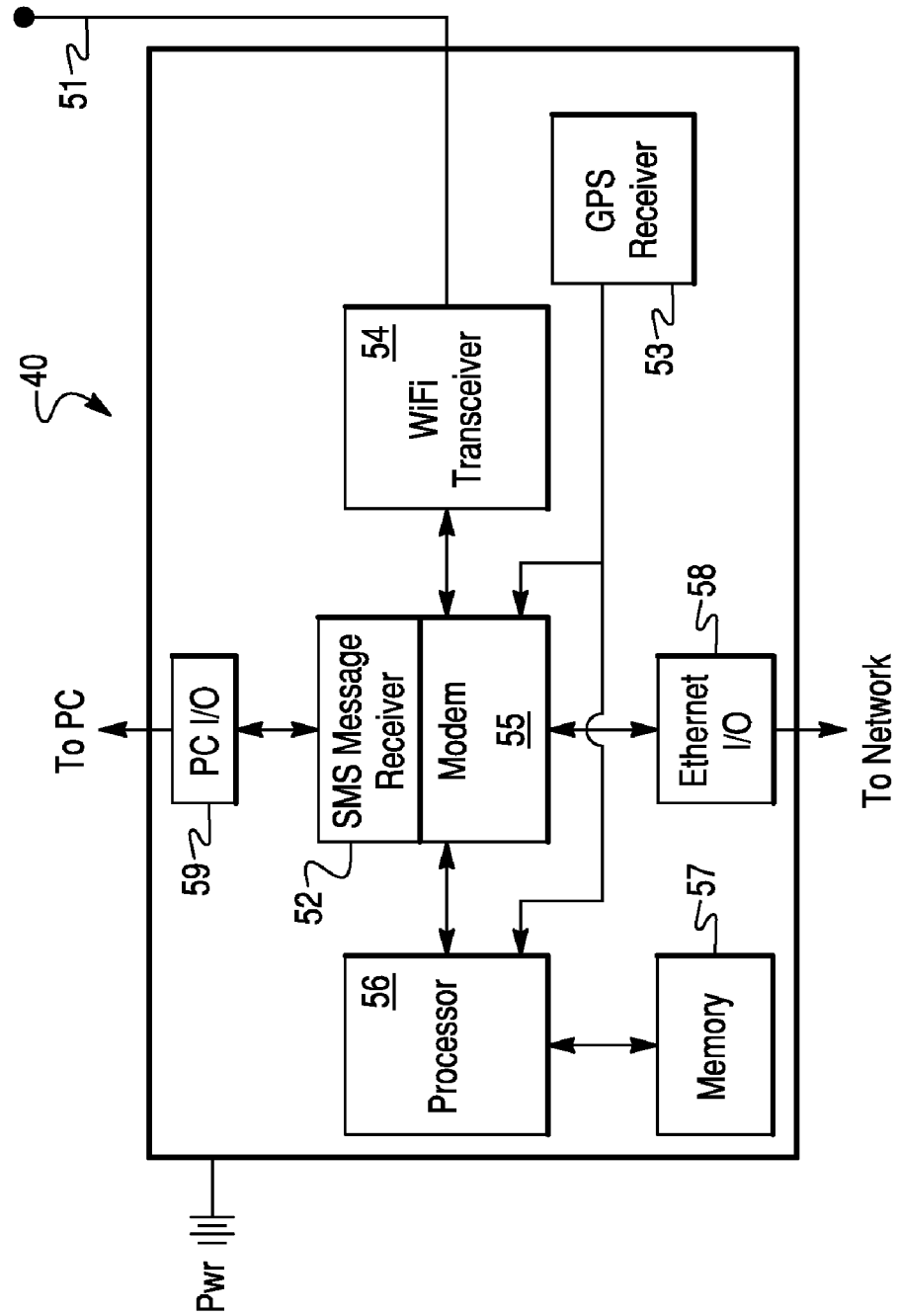

FIG. 3 illustrates another typical architecture which is fundamentally similar to the architecture illustrated FIG. 2. This architecture features a mobile computer, such as a laptop computer 34, which connects to the Internet 31 using a WiFi modem 33 that establishes a WiFi data link with a WiFi antenna 35 coupled to a WiFi server 36 that is connected to the Internet 31. The WiFi modem 33 includes an SMS receiver circuit 52 (as shown in FIG. 5A) or is configured to receive and interpret SMS messages (as shown in FIG. 5B) that can receive SMS messages from the local cell tower 23 via the modem's antenna 24.

The functions of the elements making up the various embodiments can be understood by referring to FIGS. 1, 2 and 3 together. When a user wants to activate an application on a remote computer 26, 34, the user can send an SMS message from a cellular telephone 20, step 1. The cellular telephone 20 sends the SMS message to the nearest the cell tower 21 which is coupled to the cellular telephone network 22. The SMS message is routed through the cellular telephone network until it reaches a cell tower 23 located close to the remote computer 26, 34. There, the SMS message is transmitted from the cell tower 23 to the SMS receiver in the modem 25, 33 connected to the remote computer 26, 34. The modem 25, 33 and/or the computer 26, 34 receives the SMS message and parses the message into its constituent parts, step 2. If the computer 26, 34 is turned off at the time, the modem 25, 33 operating under battery power, receives the message, determines that the computer should be started, and sends an electronic signal to the computer to initiate the startup and boot processes, step 3. When the computer 26, 34 is running, the contents of the SMS message are directed to the indicated application, step 4, and the indicated application is launched, step 5. Launching the indicated application may cause the computer to establish a connection to the Internet 31 via the modem 25, 33 connecting to an Internet access router 27, 36 by a wired 28, 30 or wireless 29, 35, 36 data link. Once connected to the Internet 31 the computer application may establish a data connection with the server 32 which can communicate with the user.

Figure 4:
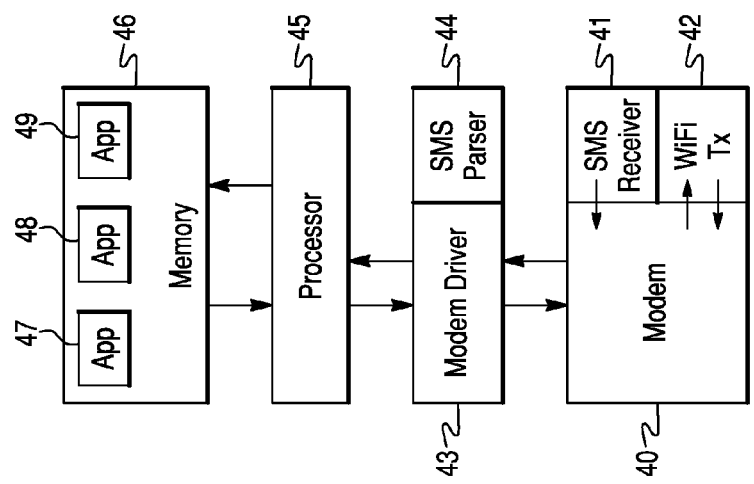
FIG. 4 is a computer system block diagram according to an embodiment.

An exemplary embodiment of the computer 26, 34 architecture is illustrated in FIG. 4. At the heart of the computer lies its processor 45 which may be any microprocessor or microcomputer. Connected to the processor 45 is memory 46, such as a hard drive, read-only memory and random access memory chips (i.e., volatile computer memory), all of which are referred to herein as the memory 46, which will have stored thereon application software 47, 48, 49. In a typical computer, application software which is not presently running on the processor 45 is stored on a hard drive computer readable memory 46. Application software that is running or in standby, maybe also loaded in volatile computer memory 46. Communications with the outside world is accomplished by means of a modem 40 which may communicate with the processor 45 through a modem driver 43, which may be software operating on the processor 45, hardware (circuits) or a combination of hardware and software as described below. A wireless modem 40 according to the various embodiments includes a SMS receiver 41 and a conventional WiFi transceiver 42. A wired modem according to the various embodiments may include a network interface circuit instead of a WiFi transceiver 42, but will also include an SMS receiver 41.

The modem driver 43 may be a separate circuit or chipset, may be implemented in software operating within the computer processor 45 or within a processor 56 resident within the modem 40, or may be implemented in a combination of software and circuits. The purpose of the modem driver 43 is to provide a data and command interface between the processor 45 and the modem 40. The modem driver 43 may also include cache memory to temporarily store data received from the modem 40 until the processor 45 is ready to receive it, and logic for operating the modem 40 in response to commands received from the processor 45. The modem driver 43 (whether implemented in hardware, software or both) may include a parsing circuit or function 44 to parse the SMS message into its constituent parts.

A wireless modem 40 suitable for use with the various embodiments, such as the embodiment illustrated in FIG. 5A, includes an SMS message receiver circuit 52 which is a circuit similar to transceiver chipsets used in cellular telephones. In one embodiment, a cell phone EDVO/CDMA (Evolution Data Optimized/Code Division Multiple Access) modem chip, which typically can receive SMS messages, can be used as the SMS message receiver 52. In another embodiment, the SMS message receiver 52 may be GSM modem chip. In yet another embodiment, the SMS message receiver 52 may be a UMTS modem chip. Additionally, cellular telephone application software, including application interface software, may be used to facilitate programming and configuring the SMS receiver 52.

A common purpose antenna 51 may be coupled to the SMS receiver 52, a Global Positioning System (GPS) receiver 53, and a WiFi transceiver 54. Electromagnetic signals picked up in the antenna 51 that are in the frequency range of the SMS signals are received and processed by the SMS receiver 52, which converts those signals into digital data. Similarly, electromagnetic signals in the frequency range of GPS signals are received by the GPS receiver 53 and processed into digital data which corresponds to the latitude and longitude coordinates of the modem's location. Similarly, signals that are in the frequency range of WiFi data links are received by the WiFi transceiver 54, and converted into digital signals that are compatible with the modem 55. Output from the SMS receiver 52 may be provided to the modem chip 55 and/or a separate modem processor 56. Similarly, digital output from the GPS receiver 53 may be routed to the modem chip 55 or the modem processor 56. Signals from the WiFi transceiver 54 may be provided to the modem 55. It should be appreciated that the WiFi transceiver 54 and modem 55 may be part of the same integrated circuit. Moreover, some or all of the elements illustrated in FIG. 5 may be integrated into one integrated circuit or chipset. Thus, the distinctions between the circuit elements of the modem 40 described herein and shown in FIG. 5 are for illustrative purposes only and are not intended to limit the scope of the invention.

The modem 40 may include a separate processor 56 for performing some of the functions required by the various embodiments. The modem processor 56, which may be any form or model of microprocessor or microcontroller, may have internal memory and/or be coupled to a memory chip 57 for storing application software and temporary results of data processing. Additionally, the modem 40 may receive power from a dedicated power source, such as a battery or the computer's power supply (which may be a battery), to enable some or all of the modem circuits to remain energized even when the computer is turned off. Finally, the modem 40 may include external network interface circuitry 58, such as for connecting to an Ethernet, and internal interface circuitry 59 for coupling the modem 40 to the computer.

In an alternative embodiment illustrated in FIG. 5B, the circuitry for receiving SMS messages can be included within or be an inherent part of the WiFi transceiver 54, while the capability to receive and process SMS messages may be provided as an SMS message receiver function 52 within the modem 55. The WiFi transceiver 54 may be configured to receive the frequency of SMS messages within its wireless receiver circuitry. Similarly, the modem 55 can be configured by software or circuitry to decode SMS message protocol in order to convert the electrical signals of received SMS messages into their encoded digital data. In this embodiment, the SMS receiver capability is an additional function provided by the modem 33 even though there is no separate SMS receiver circuit. Current and future large scale integrated circuit technology enables placing multiple wireless transceivers, modem circuitry, processor circuitry and memory within a single integrated circuit. Thus, the depiction of the SMS receiver 52, WiFi transceiver 54, modem 55 and processor 56 as separate component blocks in FIGS. 5A and 5B are for illustration purposes only.

Figure 6:
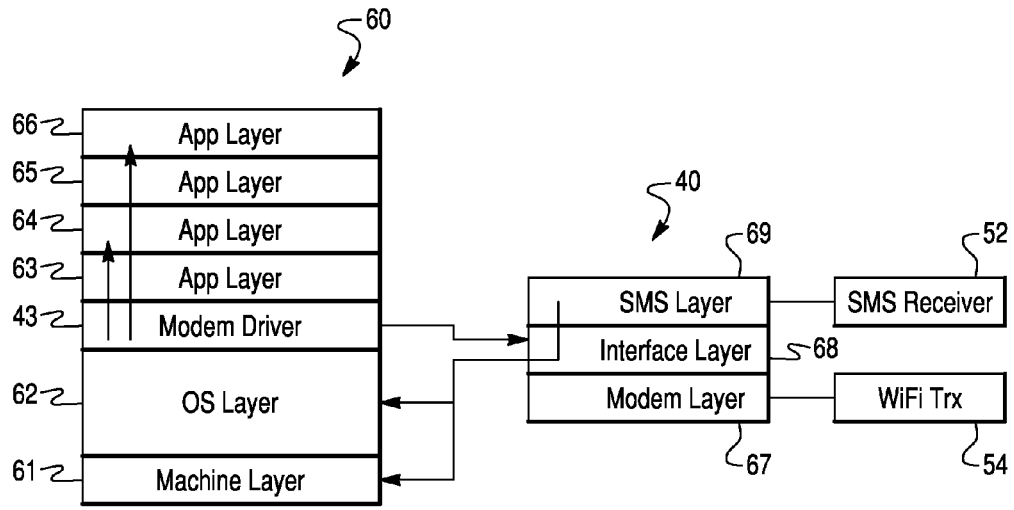
FIG. 6 is a software architecture diagram of a computer software and modem software according to an embodiment.

An exemplary software architecture of a remote computer employed in the various embodiments is illustrated in FIG. 6. As is typical, the software architecture 60 is made up of a number of layers of software functionality which interface with each other in order to accomplish the overall functioning of the computer. At the most fundamental level is the machine layer 61 made up of the processor circuitry and firmware operating therein. Above the machine layer is the operating system layer 62 which serves as the coordinator and supervisor of the applications software running on the computer. Above the operating system layer 62 are various application layers 63, 64, 65, 66. These application layers are the software modules which perform the particular functions implemented on the computer. The operating system layer 62 communicates with the exterior world through the modem driver 43 which serves as an interface between the operating system and applications on the one side and the modem 40 on the other. Data and instructions intended for the modem are sent to the modem driver 43 which formats the data and instructions in a manner suitable for the modem 40.

Similarly, the modem software may consist of multiple layers. A modem layer 67 provides the basic functionality of the modem, which is to modulate and demodulate electronic signals in order to encode data for transmission over wired and wireless data links. Coupled to the bottom layer may be the WiFi transceiver 54, which receives the electromagnetic signals from external WiFi transmitters and converts those signals into electrical signals that can be demodulated by the modem 55 or the modem layer 67 software. Above the modem layer 67 may be an interface layer 68 of software which performs processing functions necessary to communicate with the computer and its modem driver 43. Above the interface layer 68 may be the SMS layer 69 of software which functions as an interface between the SMS receiver 52 and the interface layer 68. The SMS layer 69 may also perform functions such as those described herein related to processing SMS messages in order to accomplish the application startup function of the various embodiments.

Figure 7:
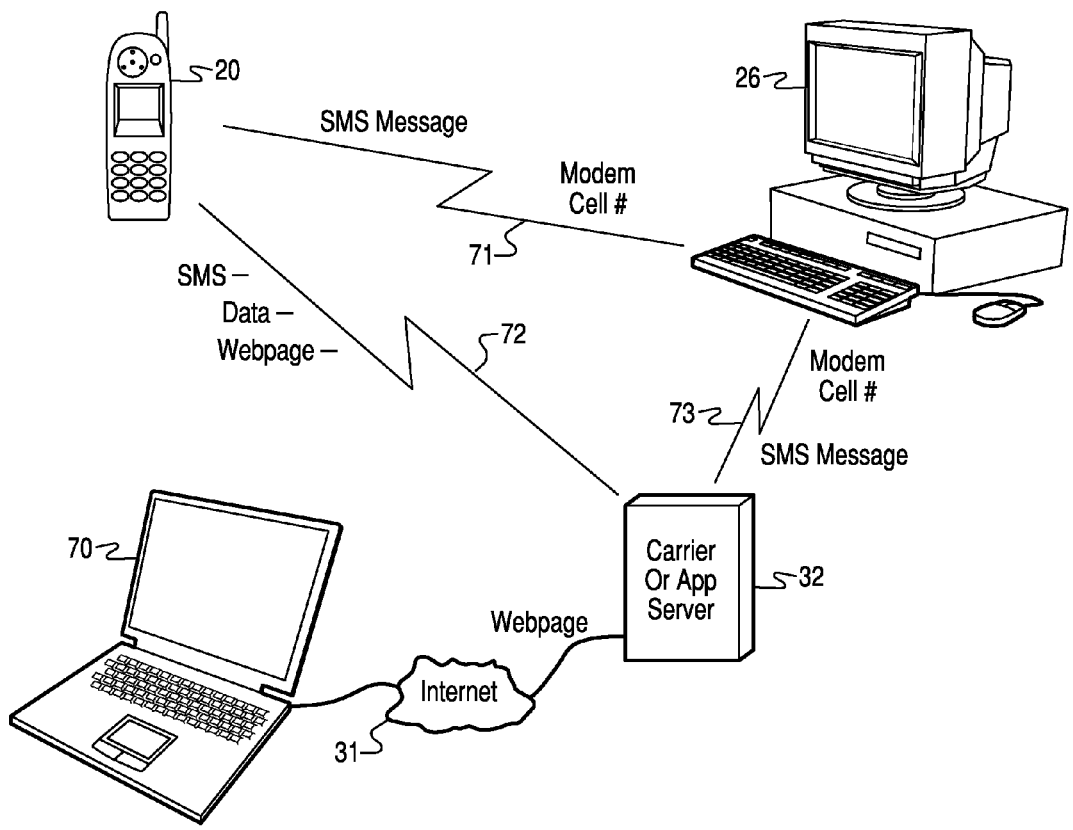
FIG. 7 is a message flow diagram according to an embodiment.

In the various embodiments, there may be at least two ways to communicate with the remote computer 26, 34. As illustrated in FIG. 7, one way is to send an SMS message 71 from a cellular telephone 20 directly to the remote computer 26 using the SMS messaging infrastructure of a cellular telephone network. Such an SMS message is sent to the cellular telephone number assigned to the SMS receiver 52 in the computer's modem 26, 33.

Another way to send an SMS message to the remote computer 26, 34 is from a server 32 which is coupled to the cellular telephone network. This server 32 may be part of the cellular telephone network or may be owned and operated by a separate service provider whose service is providing SMS remote startup capabilities of the various embodiments. To send a message using such a server 32, a user can send a message 72 to the server 32 from a cellular telephone 20 such as by sending an SMS message, email, or data transmission, or by accessing a web page hosted by the server 32 using the web browser capabilities of the cellular telephone 20. Alternatively, a user may access a webpage generated by the server 32 using another computer 70 connected to the Internet 31. Whether connecting to the server 32 by a cellular telephone 20 or another computer 70, the user may fill in a webpage form, type a message, or interface with a menu interface on a server-hosted webpage featuring hyperlinks in order to generate an SMS message with the desired content. Once the message is generated, the server 32 sends the data as a normal SMS message 73 via the cellular telephone network. As above, the SMS message 73 is sent to the cellular telephone number assigned to the SMS receiver 52 in the computer's modem 26, 33.

These two different methods for sending an SMS message to a remote computer 26, 34 provide the user with flexible and convenient ways to control a remote computer 26, 34. If the need arises to activate an application on a remote computer 26, 34 when the user only has a cellular telephone available, the cellular telephone SMS message option can be used. However, if the user has access to a computer connected to the Internet, all of the capabilities of the computer and Internet may be used activate applications and otherwise control the remote computer 26, 34.

Figure 8:
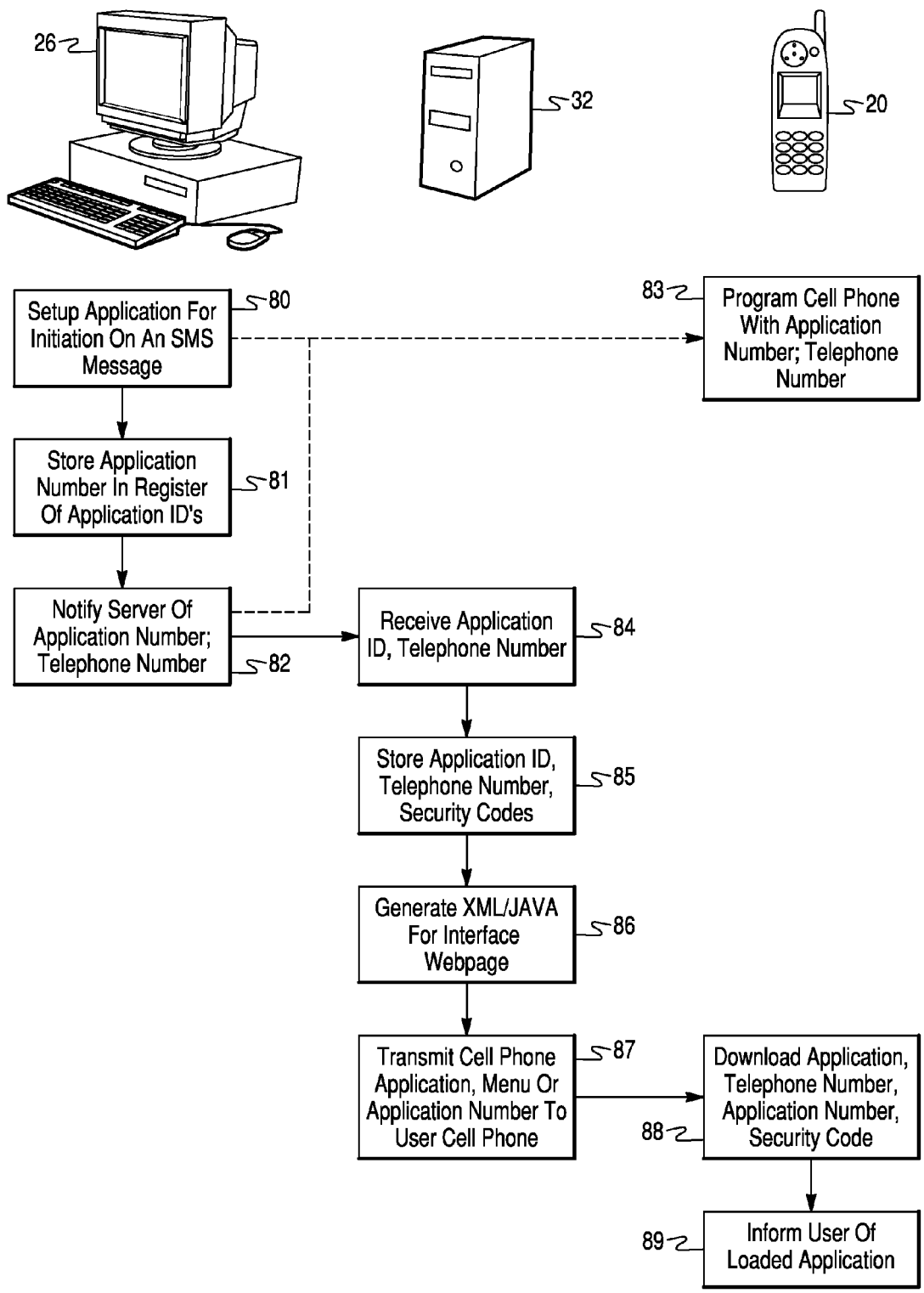
FIG. 8 is a process flow diagram of a method for initializing a system according to an embodiment.

In order to utilize the various embodiments, the remote computer 26, 34, the cellular telephone 20 and the server 32 need to be set up with a basic set of data. FIG. 8 illustrates an embodiment of an initialization or setup routine which ensures such data is available to each of the remote computer 26, 34, cellular telephone 20 and server 32. The setup routine may begin on the remote computer 26, 34 by storing data concerning each application to be initiated upon an SMS message within the computer memory, the modem driver 43 and/or the modem 40, step 80. To do so, the user identifies the applications that are to be configured for being activated remotely. This may be accomplished by a software application that presents a user interface including a list of applications to choose from. In some cases, an application when started by an SMS message may require certain data and parameters upon activation. Since the payload of an SMS message is limited, it may be beneficial to have most of the necessary operating data and parameters already prepared and stored in memory in locations known to the application. That way, upon activation by an SMS message, the application can access all the data it needs to accomplish its intended function. The software which assists the user in preparing applications for SMS activation can be configured to ensure that any data that a selected application will need upon activation is available in data storage locations known to the application or stored (such as pointers) in a data table that can be accessed by the application upon startup.

As part of preparing an application for remote startup by SMS message, an identifier for the application may be stored in a register of application IDs within the computer, step 81. Given the relatively short length of an SMS message, it is preferable to provide a relatively short identifier for an application that the computer can use to determine the application that is to be started. If the entire file name of an application were included in an SMS message, there may be too little room left in the message payload for additional data required by the application or message authentication information. The application identifier register may be a simple data table that links an application ID to the application executable file name or memory location in the computer's hard disk. Additionally, the application number register may include security and authentication parameters which can be used to authenticate an SMS message to confirm that a properly authorized user sent the SMS message.

If a cellular telephone 20 is going to be used to send SMS message commands direct to the remote computer 26, 34, then the cellular telephone 20 needs to be programmed with the telephone number of the computer's SMS receiver 52 and the application numbers that are stored in the computer's application number register. This may be a simple phone book type entry or a more sophisticated cellular telephone application in which the application number and telephone number are stored for access via the menu display. In the simplest implementation, the user may simply record a contact entry in the cellular telephone's phone book containing the SMS receiver 52 telephone number, the application number and a description or name of the application that can be remotely activation. Using such a contact entry, a user can generate an SMS message by copying and pasting information into a text message.

In an embodiment, a cellular telephone application (i.e., software running on the cellular telephone's processor) may be provided that automates the collection of the application information and stores the information in a suitable data table within the cellular telephone's internal memory. Such a cellular telephone application may receive the data directly from the computer 26, 34 using any of a number of data transfer protocols and communication connections, such as wired data connections (e.g., a USB or FireWire data cable connected between the cellular telephone and the computer), wireless data links (e.g., Bluetooth or WiFi), infrared data links, or data transmissions via the cellular telephone network (e.g., by SMS message, email or data packet transmission).

The computer 26, 34 may also notify a server 32 of the applications (i.e., the application's name) and their corresponding number that have been set up for remote activation by SMS, along with the telephone number of the SMS receiver 52 within the computer's modem 25, 33, step 82. This information will be required by the server 32 to be able to send an SMS message to the computer 26, 34 for remote application activation. Additionally, the computer 26, 34 may notify the server 32 of application authentication information which should be included in the SMS message or used to create an authentication value included in the SMS message that the computer 26, 34 will use to authenticate an SMS message command. The computer 26, 34 may send this information to the server 32 by any number of known data transfer protocols, including electronic mail, FTP, http, XML and other data transfer protocols.

When the server 32 receives the SMS receiver's 52 telephone number and application ID information, step 84, it stores this information in a register or database for future access, step 85. Further details on suitable data structures for storing such information are described below with reference to FIGS. 19A and 19B. The server 32 may also at this time generate a HTML, XML or JAVA script file for generating an interface webpage by which a user can initiate an activation command SMS message by accessing the server via the Internet 31. Finally, the server 32 may download an application to the user's cellular telephone 20 along with the telephone number of the SMS receiver 52, the application number and security code information, step 87. Once downloaded and assembled in the cellular telephone 20, step 88, such an application and implementation information may enable the user to easily send the SMS commands to the remote computer without communicating with the server 32. The cellular telephone 20 may also inform the user that the application and associated data have been loaded and are available for use, step 89.

Once an application has been registered for remote activation by means of an SMS message, that application and the computer 26, 34 itself may be shut down if not required for other activities. In the process of shutting down applications or the computer itself, the computer 26, 34 may inform the server 32 of its status or the applications that are being shut down. While the various embodiments do not require the server 32 to maintain the current status of an application or the remote computer, there are advantages to informing the server 32 when an application or the computer is about to be shut down. By maintaining a status of the running and shutdown applications on the remote computer, the server 32 can inform the user of the status and thereby avoid sending unnecessary SMS messages to activate applications that are already running. Also, the application information and security codes can be updated when each application (or the remote computer itself) prepare for shutdown, thereby improving the reliability and security of the overall system.

Figure 9:
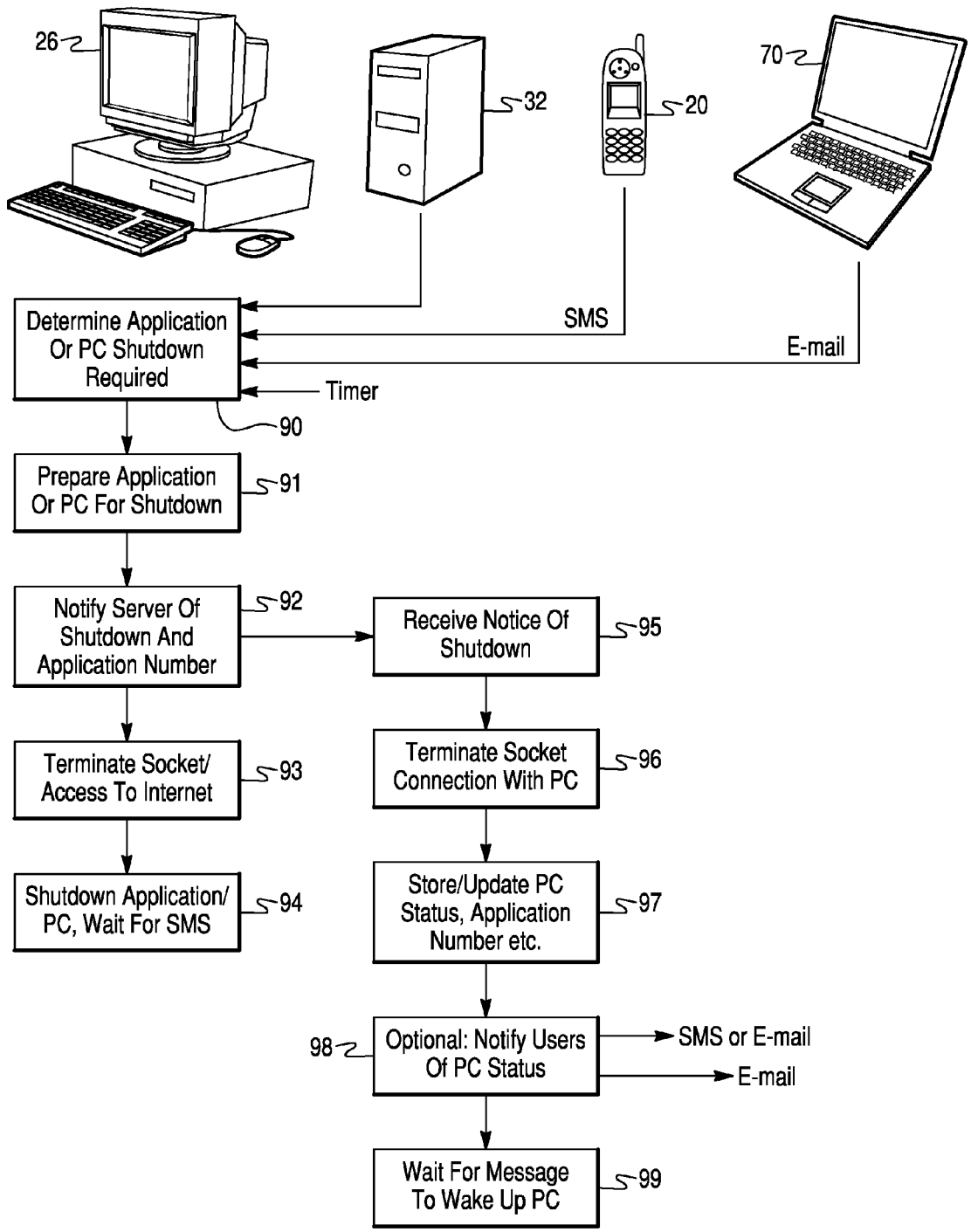
FIG. 9 is a process flow diagram of a portion of the operation of an embodiment.

FIG. 9 illustrates an example method by which the remote computer 26, 34 can inform the server 32 that an application 47, 48, 49, etc. (or the computer itself) is about to be shut down and to prepare the application (e.g., 47, 48, 49) and/or computer 26, 34 for activation by SMS message. First, the computer 26, 34 may determine that an application (or the computer itself) should be shut down, step 90. This determination may be based on a number of factors. First, the computer 26, 34 may determine the need to shut down an application based upon internal information, such as by determining from a timer that the application has not been used within a predetermined amount of time, and therefore can be shut down without impacting current operations. In addition to a timer, shutdown may be based on a time of day, day of week or calendar day, depending upon the application and the intended use of the computer 26, 34. Second, a user can tell the computer 26, 34 that an application (or the computer itself) should be shut down by sending an email to the remote computer, such as from another computer 70, or an SMS message to the computer's SMS receiver 52, such as from a cell phone 20. Similarly, the user may send such a message via the server 32, such as by accessing a web page hosted by the server and selecting from a menu of command options. In response to such a user selection, the server may send an http, email, XML or SMS message to the remote computer 26, 34.

When an application (e.g., 47, 48, 49) is selected for shut down, the computer prepares the application (e.g., 47, 48, 49) or the computer 26, 34 itself for shut down by storing data that will be required upon activation in designated storage locations, step 91. This preparation may be similar to a hibernation preparation routine implemented on personal computers. In this process, information may be stored to the hard drive in locations known to the application to enable its quick recovery upon activation by an SMS message.

In parallel with preparing an application (e.g., 47, 48, 49) or the computer 26, 34 for shutdown, the computer may notify the server 32 that the shutdown is about to occur, providing the application number and related information, step 92. This notification and data may be sent using any available connection to the server, including an Internet connection, such as by sending an http message or e-mail message.

Having prepared the application (e.g., 47, 48, 49) or the computer 26, 34 for shutdown and notified the server 32 of the pending shutdown, the computer 26, 34 then terminates any socket connection to the server 32 and may terminate its access to the Internet 31, step 93. Disconnecting from the Internet 31 reduces data communication costs while such communication is unnecessary. In addition to potential savings, disconnecting the computer from the Internet 31 may also enhance computer security by isolating the computer 26, 34 from outside networks and potential hackers.

Finally the application (e.g., 47, 48, 49) and/or the computer are shut down and the wireless modem enters a state in which it monitors SMS messages addressed to it, step 94.

When the server 32 receives notice from the computer 26, 34 that an application (e.g., 47, 48, 49) or the computer 26, 34 is being shut down, step 95, the server 32 may terminate any open socket connection with the computer, step 96, and store the application number within a database, step 97. The server 32 may also update a status tracking database to reflect the fact that the application and/or computer are shutdown. The server 32 may also receive updated or new security information (e.g., an application authentication value) provided by the computer 26, 34 that may be used to authenticate SMS start up messages as described more fully below.

Optionally, the server 32 may send one or more messages to notify the user of the change in the status of the computer, step 98. Such a notification message can be sent to the user's cellular telephone 20 as an SMS message or an e-mail message. Similarly, a notification message can be sent to a user on a personal computer 70, such as in an e-mail message. To know where to send such notification messages, the server 32 may store a database of users associated with computers registered for SMS activation services, with that database including the users' cell phone number, e-mail address, and authentication information, such as username, password, fingerprint template, voice print template, etc. Alternatively, the database used to record computers registered for SMS activation services may include within a data field the associated user's contact, biographical and authentication information.

Finally, the server 32 waits to receive a message from users that will request it to wake up an application or computer, step 99.

Figure 10:
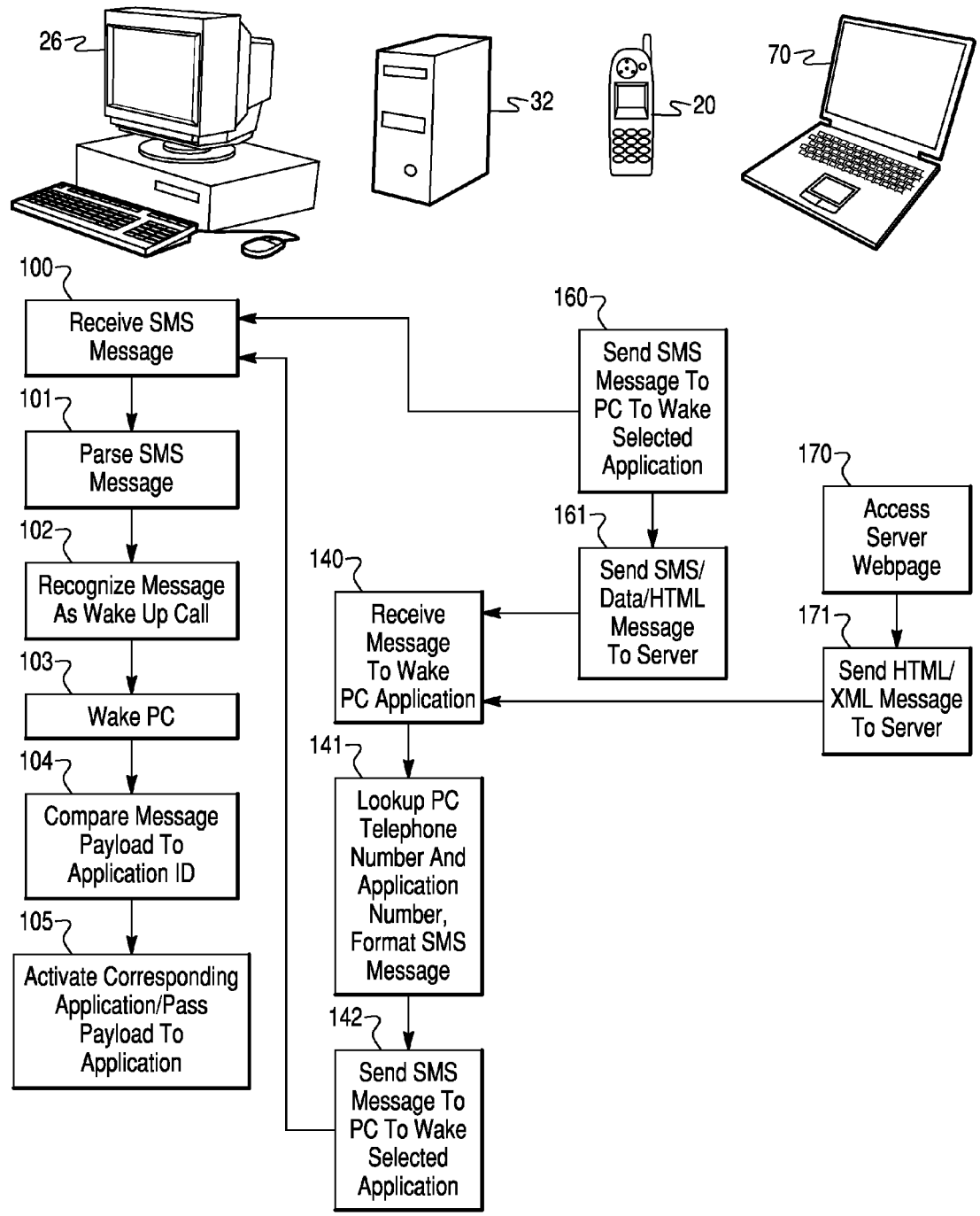
FIG. 10 is a process flow diagram of the normal operations of an embodiment.

An example method by which a user can initiate an application on a remote computer is illustrated in FIG. 10. In a first option, the user may send an SMS message from the user's cellular telephone 20 to the remote computer 26, 34, step 160. To do this, the user can type in the telephone number of the SMS receiver 52 within the modem 25, 33 of the remote computer 26, the application number for the application (e.g., 47, 48, 49) to be started, and any data that will be used by that application, and then send the message like any other SMS message. Alternatively, the user may select the remote computer telephone number from a phone book which includes the various application numbers and associated data, and construct the SMS message by making selections in an SMS message generation application running on the cell phone. In an embodiment describe more fully below with reference to FIGS. 21 and 22, the user may interface with an application running on the cellular telephone 20 that automatically generates the desired SMS message in response to user selections from a menu presented on the cellular telephone display.

In a second option, the user may make use of SMS activation services provided by a server 32 that can be accessed via the Internet 31. In this option, the user may access a webpage hosted by the server 32 which provides menu options for remotely activating computer applications, step 170. This access may be achieved via another computer 70 in communication with the Internet 31. Such a web site can be configured to allow the user to log in and authenticate himself/herself and identify the computer to be remotely activated. The server 32 may populate this webpage with the names or descriptions of the applications which can be controlled remotely (i.e., the applications that have been registered with the server 32 for remote activation). By accessing this webpage, a user can select the specific application or applications to be started and enter any data that may be used by such application(s) by selecting hyperlink menus or entering data into data entry windows. Based on the user's entries and menu selections, the computer 70 can generate a message that is sent to the server 32 providing the required information, step 171. Such a message may be sent in http, HTML, XML, e-mail or other computer-to-computer data transfer protocol.

As a third option, the user may send a message from the user's cellular telephone 20 to the server 32 requesting the server to wake up an application (e.g., 47, 48, 49) on the remote computer 26, 34, step 161. Such a message may be an SMS message sent to the server 32, an e-mail or data message sent to the server, or responses to data entries and hyperlink menu options on a website generated by the server 32 and displayed on the cellular telephone 20. Since cellular telephone networks enable accessing Internet web sites on cellular telephones, the user may access the same (or a similar) website posted by the server 32 by either a cellular telephone 20 or a computer 70 connected to the Internet.

Messages sent to the server 32 may specifically identify the remote computer 26, 34 on which the application (e.g., 47, 48, 49) is to be activated, such as by providing a computer identifier or the telephone number of the computer's SMS receiver. The computer identifier may be a serial number or account number given to the user by the SMS activation service provider at the time the user signs up for the service. Alternatively, the user's identify may indicate the computer 26, 34 to be remotely activated if the user has only registered one computer for SMS activation services. The user's identity, and thus the indication of the remote computer, may be determined from the sending address of the message (SMS message, e-mail or http packet), which may be obtained from the message header or packet header.

When the server 32 receives a message from a user, whether from the user's cellular telephone 20 or computer 70, step 140, the server 32 uses the information in the message to look up the remote computer's modem cellular telephone number, the application number, any application authentication values, and any additional requirements, step 141. As noted above and described more fully below with reference to FIGS. 19A, 19B, such information may be stored in a database maintained by the server 32. The server 32 then assembles the recalled information regarding the computer 26, 34 and application (e.g., 47, 48, 49) to be started into an SMS message, and sends that SMS message to the remote computer, step 142.

Whether the SMS message was sent by a cellular telephone 20 or an SMS startup services provider server 32, the message is received by the SMS receiver 52 in the computer's modem 40, step 100. The SMS message is parsed into its constituent parts, step 101. The parsing operation may be performed within the modem 40 (such as by the modem's processor 56), the modem driver 43 or other computer software. In parsing the SMS message, the message identifier, the application number identifying the application to be started, any authentication values and any payload data are broken out and stored in memory for processing by the modem processor 56 and/or the computer processor 45. The authentication values may be used by the modem 40 (such as in an algorithm executed by the modem's processor 56) to authenticate the SMS message, prior to waking or otherwise notifying an attached computer 26, 34.

In an embodiment, part of the SMS message may serve as a flag to indicate that the message to be processed is an application startup command. In this embodiment, a data field within the SMS message may include a particular pattern of bits to signal that the SMS message should be interpreted as an application startup instruction. For example, the first four bits in the message payload may be used to indicate the type of message that as being sent. This capability allows the use of SMS messages for other housekeeping purposes, such as to transmit information to the computer 26, 34, to request the computer 26, 34 to report its status, to request a computer 26, 34 to shut down, etc. Thus, after the message has been parsed, the modem processor 56, modem driver software, or computer software can examine this data field to determine if the message is an application startup command, step 102.

If the computer 26, 34 is shutdown at the time the SMS message is received, and the modem processor 56 recognizes that the message requires activating an application, the modem processor can send a signal to the computer to turn it on and start the boot sequence, step 103. This signal to turn on the computer 26, 34 can be sent by the modem processor 56 through the internal interface circuitry 59 which may include an additional lead connected to a startup signal lead within the computer (e.g., the lead coupled to the computer's activation button). The modem processor 56 may then wait until a flag is set in computer memory or some other signal is received indicating that the computer 26, 34 is on and the boot sequence has been completed.

With the computer 26, 34 running, the application number contained in a portion of the SMS message payload can be compared to a data table of application identifiers to determine the particular application (e.g., 47, 48, 49) that is to be launched, step 104. This data table comparison can be accomplished by software running on the computer 26, 34, the modem driver 43, a software module within the modem driver (e.g., an SMS parser), or a processor 56 within the modem 40.

The use of a data table look up procedure in the remote computer 26, 34 or its modem 40 to determine the application (e.g., 47, 48, 49) to be started is only one example of how the computer or modem can determine the application to be started from the content of the SMS message. Other methods can be used, such as including the entire file name and/or file location in the SMS message. However, the data table look up procedure allows applications to be identified by a short application number that does not take up much of the SMS message payload. This can be advantageous since the entire application file name and/or memory location can be a lengthy string compared to the length of an SMS message. The application number may be any alphanumeric value or character and only needs to be unique to one application in the remote computer 26, 34. For example, application numbers may be simple ordinal numbers from 1 to the number of applications set up for SMS activation in a particular computer 26, 34. An SMS service provider database will include a unique identifier (ID) for each remote computer 26, 34 (e.g., the SMS receiver cell telephone number) that is supported by the service. Therefore, the combination of the computer ID and application number provides a unique ID for each computer-application registered with the server 32 for SMS activation.

With the application data recovered from the SMS message, the computer 26, 34 can activate the corresponding application, step 105. Some activated applications may use data or parameters that may be provided in the payload of the SMS message. In such cases, the payload data will be routed to the application at or soon after its startup. For example, if the application to be started is to download a file to another computer, the SMS message payload may include the name of the file to be downloaded and the destination address (e.g., e-mail address) to which the file is to be sent. In this example, the application would be provided the file name and destination address at or soon after application activation.

Utilizing the operating methods illustrated in FIG. 10, any number of different applications may be set up to be activated remotely by a user. While any currently used applications may be remotely activated, this capability enables a variety of new applications and uses, nonlimiting examples of which are described below with reference to FIGS. 11 through 17.

Figure 11:
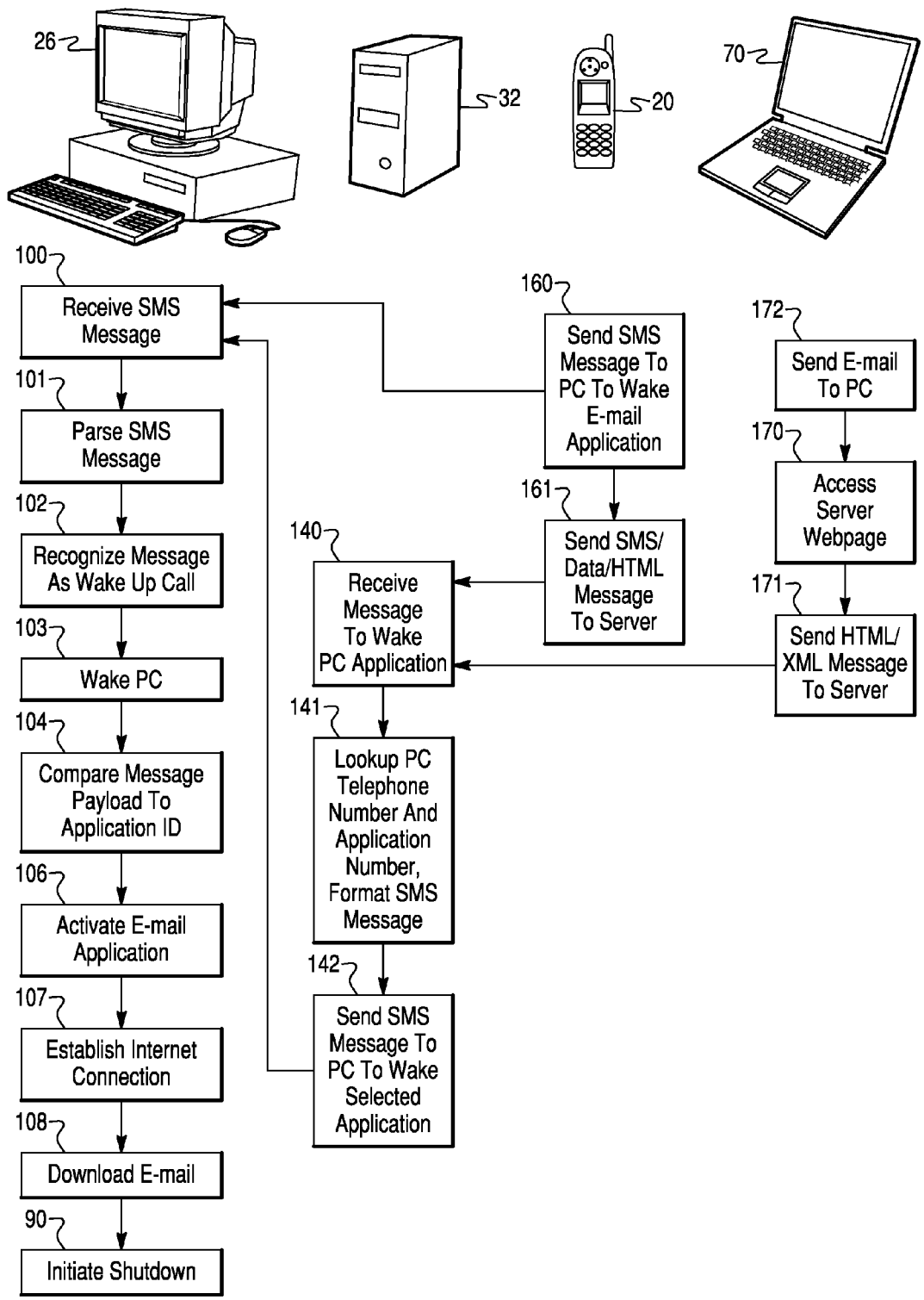
FIG. 11 is a process flow diagram of an embodiment for activating a remote computer's e-mail application.

FIG. 11 illustrates a method for activating a remote computer's e-mail system such as to download e-mail that is stored on an e-mail server. In a situation where a personal computer 26, 34 is shut down for an extended period of time, such as when the user is on vacation, incoming e-mail will be held in a e-mail server until it is downloaded by the computer e-mail program. Over time, the user's e-mail server account may become full, after which additional emails will be rejected and senders may receive a message that the user's inbox is "full." While the user may be able to read e-mail using a remote e-mail access device or cellular phone, it may not be possible to empty the e-mail server account while retaining copies of the emails. Therefore, the ability to remotely activate the computer 26, 34 to download e-mail provides users with a convenient way to clear their e-mail server account so that they can continue to receive e-mail.

As with the general method illustrated in FIG. 10, the user can activate the e-mail application remotely by sending an SMS message from the user's cellular telephone 20 to the computer 26, 34, step 160, or by sending a message to the server 32 requesting activation of the e-mail application, step 161. If the user has access to a computer 70 connected to the Internet (e.g., in an Internet café), the user may access a webpage hosted by the server 32 and send a message to the server requesting activation of the e-mail account, steps 170, 171. Collaterally, the user may want to send an e-mail to the user's e-mail account to see if new e-mail are being rejected or to forward information for retention, step 172.

When the remote computer's modem receives an SMS message from either the user's cellular telephone 20 or the server 32, the computer 26, 34 parses the message, step 101, recognizes that the message requires activation of the computer 26, 34 and an application (e.g., 47, 48, 49), step 102, turns on the computer if necessary, step 103, and compares the application number in the SMS message payload to an application ID data table to determine that the e-mail application should be activated, step 104. The computer then starts the e-mail application, step 106, and establishes an Internet connection, step 107, after which the e-mail application contacts the e-mail server and downloads e-mail pending in the inbox, step 108. If no further actions are required or no further SMS messages are received within a predetermined period of the time, the computer may initiate a shutdown, step 90, following a method similar to that described above with reference to FIG. 9.

Figure 12:
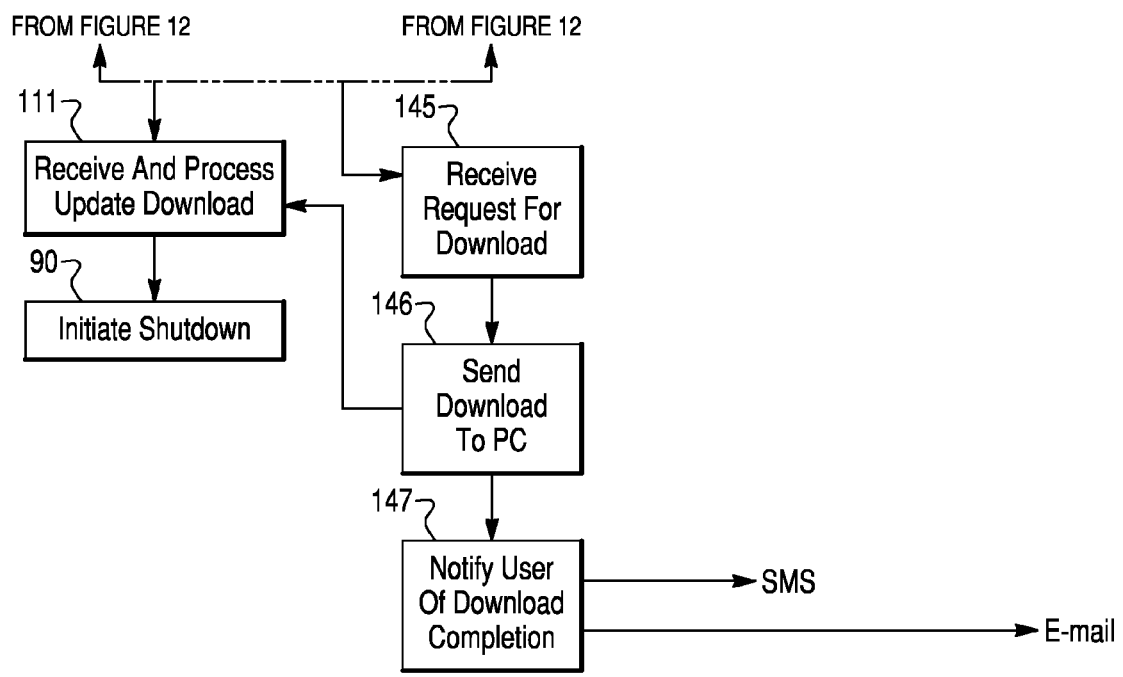
FIG. 12 is a process flow diagram of the main embodiment for initiating a software update download to a dormant computer.

FIG. 12 illustrates a method by which a user can send an SMS message to a remote computer 26, 34 to instruct it to download a pending software or data update. Such a capability may be useful when the user learns that a software update is available and wishes to have the update installed but is not near the computer 26, 34 at the time.

A user may learn of the software update availability through a variety of channels, such as press articles or e-mail. In the case of software that is available through the SMS activation service provider server 32, the server may send an SMS message or e-mail to the user notifying the user of the update availability, step 143.

Alternatively, the user may create the update by uploading data or new software to the server 32 with instructions to hold it for download to the remote computer 26, 34, step 173. Uploading an update may be accomplished by using a computer 70 coupled to the Internet to send the data to the server 32 using any of a variety of data transfer protocols, such as FTP, http, e-mail, etc. When the server receives the update, it stores the software or data in memory for subsequent downloading to the remote computer, step 144. Optionally, the process of uploading an update to the server 32, step 173, may also instruct the server 32 to remotely activate the computer 26, 34 to download the update, step 140.

When the user learns of the availability of an update or desires to complete the process of updating the remote computer 26, 34 with information stored on the server 32, the user can send an SMS message by cellular telephone 20 or a computer 70 using the same methods as described above with reference to FIG. 10.

When the computer modem 25, 33 receives the SMS message from either the user's cellular telephone 20 or the server 32, the computer parses the message, step 101, recognizes that the message as requires activation of the computer 26, 34 and an application (e.g., 47, 48, 49), step 102, turns on the computer if necessary, step 103, and compares the SMS message payload to an application ID data table to determine that the update download application should be activated, step 104. The computer 26, 34 then starts the update download application, step 109, and establishes a connection to the Internet, step 107. To accomplish the download, the computer 26, 34 can send a message to the server 32 requesting download of the pending update, step 110. By sending this message, an Internet socket communication connection is established with the server 32 to facilitate the download process. In the server 32, the reception of a request for the download, step 145, prompts the server to call the stored update from memory and prepare it for transmission through the now open socket. The server 32 sends the download to the remote computer 26, 34 using any of a variety of computer-to-computer data transfer protocols, step 146. When the download has been completed, the server 32 may notify the user that the download was accomplished, step 147. Such notification can be in the form of an SMS message to the user's cellular telephone 20 or by e-mail to the cellular telephone 20 or a computer 70. In the remote computer 26, 34, the downloaded file is received and the update process completed by the update download application, step 110. When the update process is completed, the computer 26, 34 may initiate shutdown of the download update application, and potentially of the computer itself, in a manner similar to that described above with reference to FIG. 9, step 90.

Figure 13:
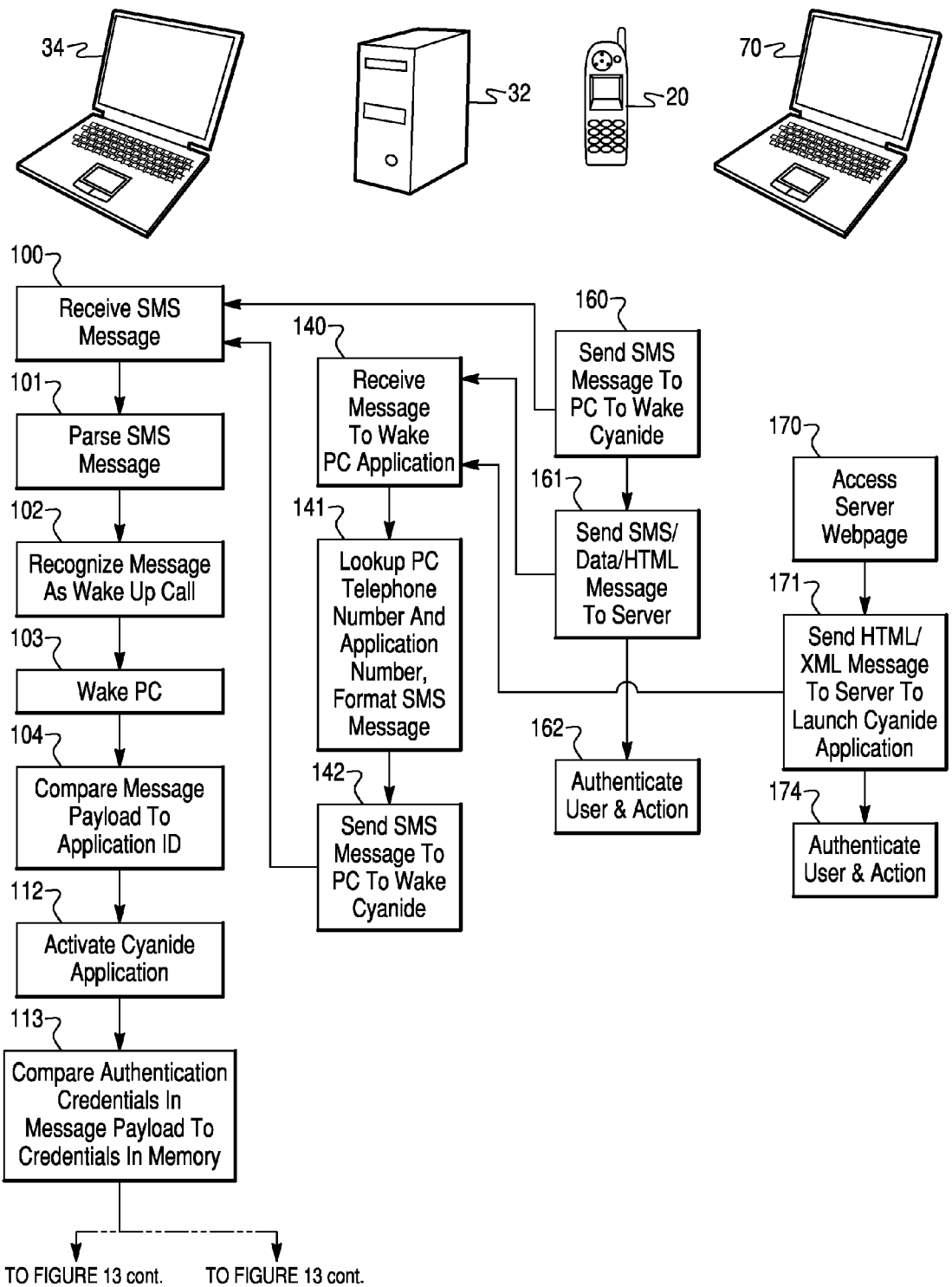
FIG. 13 is a process flow diagram of an embodiment by which a computer can be directed to delete or encrypt files by a SMS message.
Figure 13:
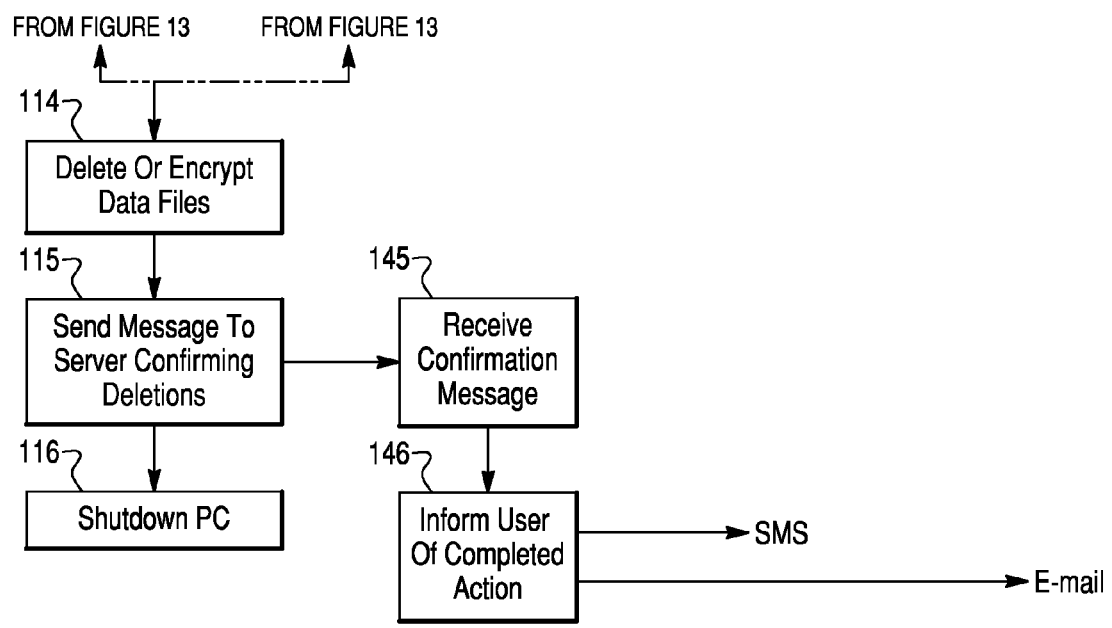

FIG. 13 illustrates the use of the SMS remote application startup capability to delete or encrypt most or all files on a laptop computer 34 as may be desired in the event the computer 34 is lost or stolen. For ease of reference, this application is referred to herein as a "cyanide application" since the computer 34 renders useless the data stored on its hard drive. The cyanide application may be useful for laptop computers containing sensitive information to permit users to destroy such information if the laptop computer 34 is ever lost or stolen. If activated promptly, such as before a thief can download data or remove the hard drive, sensitive data can be secured or destroyed before it is compromised. Since SMS messages are sent via the cellular telephone network, are held by the cellular carrier until successfully delivered (at least for a few days), and are received by an SMS receiver 52 that can be powered even when the laptop computer 34 is off, the computer does not need to be turned on or connected to the Internet in order to activate the cyanide application. Also, if the laptop computer 34 is out of range of or shielded from cellular telephone signals, the SMS message will continue to be sent for a few days until the laptop computer 34 is moved to a location where it can receive the message.

If a user discovers that a laptop computer 34 has been lost or stolen, the user can send an SMS message to the laptop computer 34 instructing it to activate the cyanide application using any of the methods described above with reference to FIG. 10. These methods include sending an SMS message from the user's cellular telephone 20, step 160, and accessing a web site posted by the server 32 to request activation of the cyanide application, step 170.

Since the deletion or encryption of most or all files on a laptop computer 34 is an extreme measure that would be costly if done maliciously or by accident, activation of this application may require additional user authentication and confirmation. For example, selecting the cyanide application on a server webpage, step 170, 171, may prompt the server 32 to reply with an authentication webpage requiring the user to enter in some authentication credentials, steps 162, 174. Such user authentication credentials may be a simple username and password combination. Authentication credentials may also include biometric data that may be entered by a biometric scanner, such as a fingerprint or retinal scanner connected to the computer 70 or cellular telephone 20. Additionally, the server 32 may request confirmation that the user desires to activate the cyanide application along with a warning that the process is irreversible. Such user authentication and confirmation information may be used by the server 32 to determine whether the cyanide application activation message should be sent, step 142. Additionally, some or all of the user authentication information may be included in the SMS message payload so that the laptop computer 34 can also authenticate the user and verify the request to activate the cyanide application.

When the laptop computer 34 receives the SMS message, the message is processed and the computer and application activated in the manner described above with reference to FIG. 10 (steps 100-104). When the computer activates the cyanide application, step 112, that application may compare user authentication credentials contained in the message payload to credentials stored in memory, step 113, in order to authenticate the user and verify the user's request. Once the user has been authenticated, the cyanide application performs the processes of deleting or encrypting data files and/or software applications, step 114. The laptop computer 34 may also open a connection to the Internet (e.g., by accessing a WiFi network) and send a message to the server 32 confirming that the files have been deleted or encrypted, step 115. When the server 32 receives the confirmation message from the laptop computer 34, step 145, the server may send a message to the user's cellular telephone 20 or computer 70 by e-mail or SMS message informing the user that the cyanide application has been completed.

As a final measure, the cyanide application may set a password on the laptop computer 34 and shut down the computer so that it is not readily usable by someone other than the user, step 116.

The cyanide application may employ any of a number of available routines for encrypting data files or irretrievably erasing files from the hard drive. Also, the application may be configured to display a dark screen and not activate operating lights during the operation so as not to tip-off a thief that the computer is in the process of deleting or encrypting files. Alternatively, the application may be configured to operate in the background so that a user of the laptop computer would not realize that files are being encrypted or deleted until the process was completed.

Figure 14:
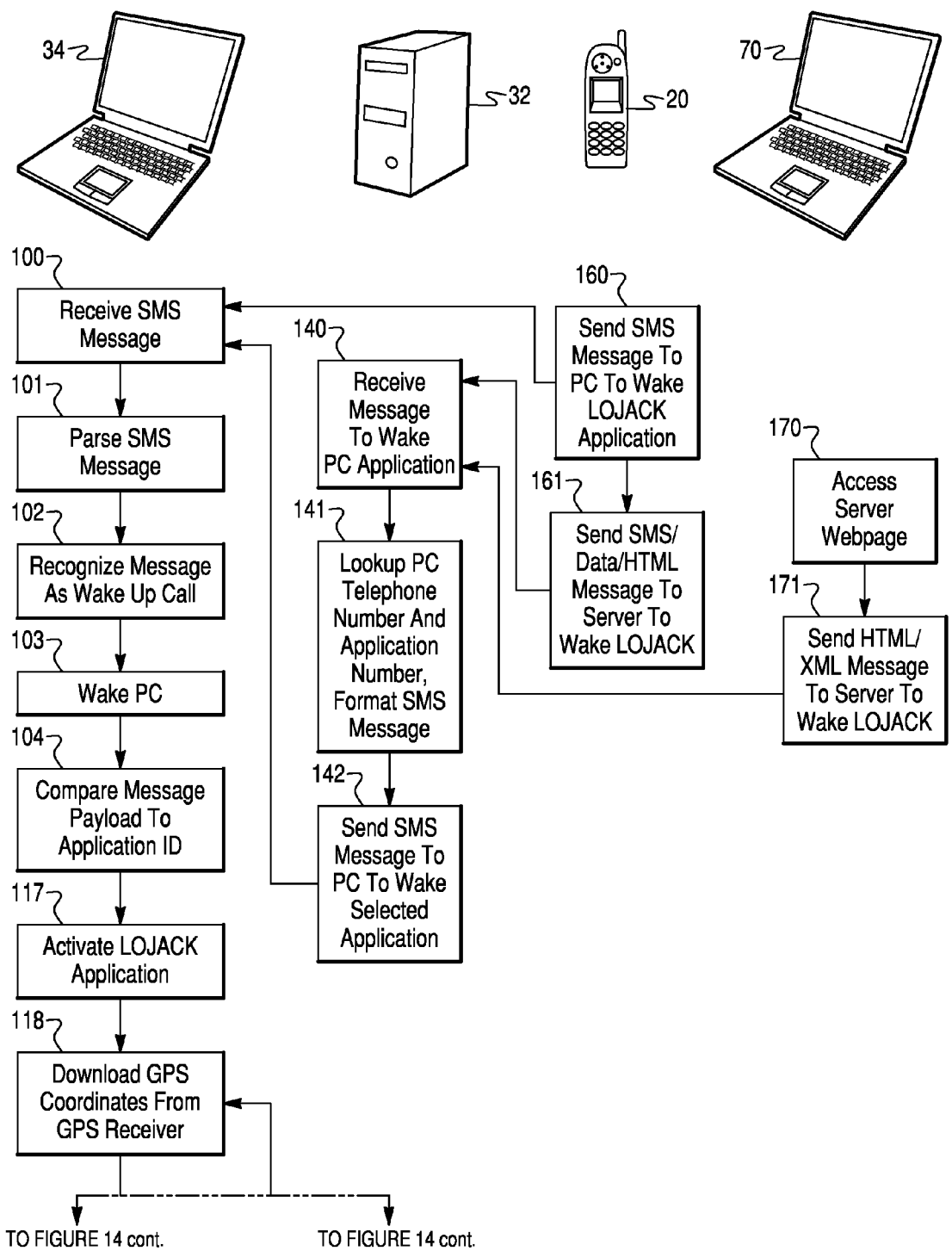
FIG. 14 is a process flow diagram of an embodiment in which a computer can be activated to report its GPS location.
Figure 14:
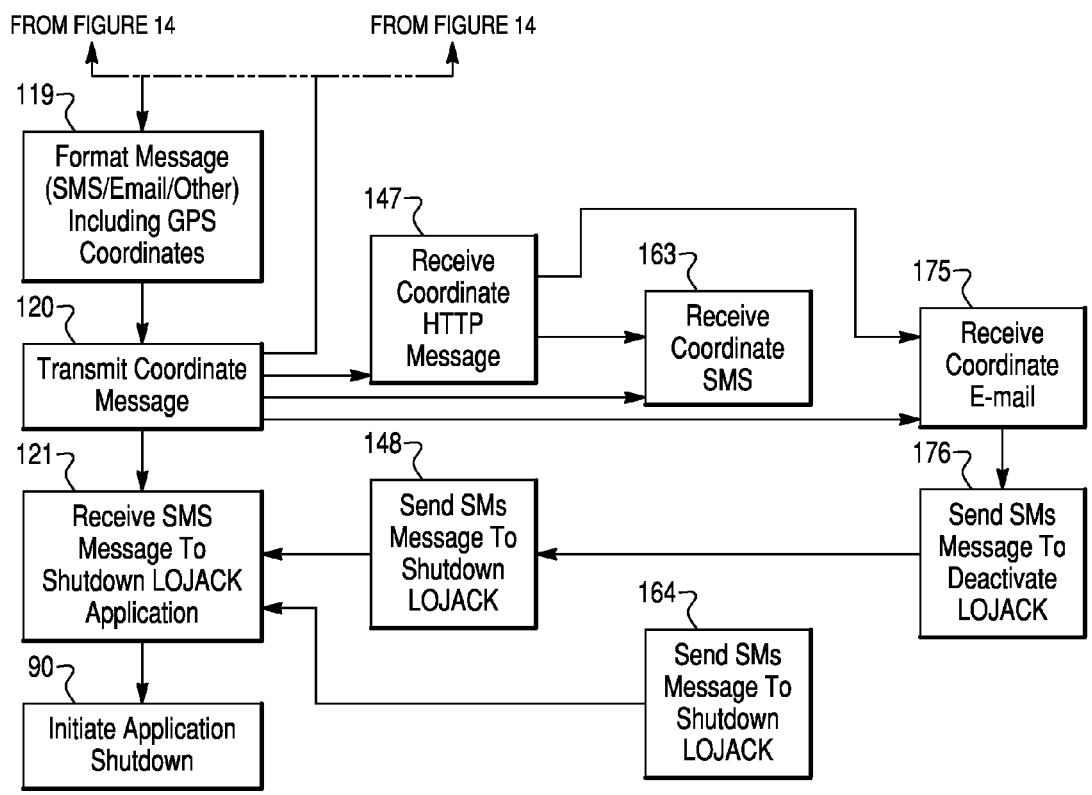

FIG. 14 illustrates an application in which remote activation of a computer application by a SMS message is used to enable the computer 26, 34 to report its location. This application may be useful particularly for laptop computers 34 which, due to their portability, may be easily misplaced, lost or stolen. Whether the laptop computer 34 is running or not, a user can send an SMS activation message that causes the laptop computer 34 to wake up, determine its position using a GPS receiver within the modem, and send a message reporting its position (e.g., in the form of geographic coordinates). For ease of reference, this application is referred to herein as the Laptop Locator application. While the technology, function and method of this application are quite different, the self reporting of position when activated is similar to the automobile theft prevention system known as LoJack®.

Since the SMS message is delivered via a cellular telephone network and the SMS receiver in the laptop computer modem 33 can be energized even when the laptop computer 34 is off and/or disconnected from the Internet, this capability provides a mechanism for prompting the laptop computer 34 to activate itself and report its location no matter its location or status. It is worth noting that laptop users may find the Laptop Locator application useful in combination with the cyanide application so the user can first determine if the laptop computer 34 has merely been misplaced before deciding whether to delete files on the hard drive.

Referring to FIG. 14, as soon as a user notices that the laptop computer 34 is missing, the user can send an SMS message from a cellular telephone 20, step 160, 161, or by using a computer 70 with access to the Internet, step 170. The steps involved in sending such an SMS message, either directly or by way of a server 32, are substantially similar to the same steps described above with reference to FIG. 10. Similarly, when the remote laptop computer 34 receives the SMS message, step 100, the message is processed in a manner similar to the processing described above with reference to FIG. 10, steps 101-104.

When the laptop computer 34 recognizes that the SMS message requires activation of the Laptop Locator application, step 104, that application is initiated, step 117. The computer energizes the GPS receiver circuit 53 in the modem

40, allows the GPS receiver to acquire sufficient signals to determine its location, and downloads the GPS coordinates, step 118. The computer formats one or more messages to be sent to the user, including the GPS coordinates in the message payload or as an attachment, step 119, and then transmits the message(s) to the user through one or more available communication paths, step 120. To transmit the location message, the laptop computer 34 may attempt to establish an Internet connection, such as by means of a WiFi network or attached network cable. If an Internet connection is established, then the laptop computer 34 can report its position by sending an e-mail to the user, which the user can receive on any computer 70 connected to the Internet, step 175. Alternatively, the laptop computer 34 can transmit its GPS coordinates by sending an e-mail, http or XML message to the server 32, which can receive the information and forward it on to the user in the form of an SMS or e-mail message, step 147. In an embodiment, the SMS receiver 52 in the modem 40 can be capable of two-way communication, such as typical in a cellular telephone. Using such a modem, the laptop computer can also report its location by sending an SMS message to the user's cellular telephone 20 or the server 32 with the GPS coordinates included in the message payload, step 163. To enable the laptop computer 34 to report its position to the user's cellular telephone 20 by SMS message, the activating SMS message may include in the message payload the cellular telephone number to which the reporting SMS message is to be directed.

The Laptop Locator application may continue to periodically download its GPS coordinates, and format and transmit messages reporting those coordinates to the user until the laptop computer 34 runs out of battery power or receives a message to discontinue reporting. The user can instruct the remote computer 34 to suspend the Laptop Locator application by sending an SMS message from the user's cellular telephone 20, step 164, or by sending a message from a computer 70 to the server 32 requesting deactivation of the application, step 176. Once such a request is received by the server 32, it formats and sends an SMS message to the laptop computer 34 requesting shutdown of the Laptop Locator application.

When the laptop computer 34 receives a SMS message instructing it to shut down the Laptop Locator application, that message may be processed in a manner similar to the processing of all incoming SMS messages (steps 100-104). Alternatively, the Laptop Locator application may anticipate the shutdown message and act on such a message directly, step 121. The Laptop Locator application may be shut down in a manner similar to that explained above with reference to FIG. 9, step 90. However, given the circumstance in which the Laptop Locator may be activated, such as when theft is suspected, the Laptop Locator application may simply shut the computer down in order to conserve battery power so that it can be activated again in the future or periodically by the user.

As with the cyanide application described above, the Laptop Locator application may be configured to display a dark screen and not activate operating lights during the reporting operation so as not to tip-off a thief that the computer is in the process of reporting its location. Alternatively, the application may be configured to operate in the background so that an unauthorized user of the laptop computer would not realize that the computer is also reporting its location to its rightful owner.

In an embodiment, the laptop computer 34 or the server 32 include a mapping software application that receives the latitude and longitude coordinates from the GPS receiver (or from the payload of a location reporting message) and determines the location in terms of a street address. This street address can then be reported to the user in any of the reporting message formats described above. Also, the location of the laptop computer 34 may be displayed on a street map presented on a webpage posted by the server 32 for access by the user (e.g., through a computer 70 or cellular telephone web browser). Such mapping software applications are well known in the computer arts.

In an alternative embodiment, the computer modem 40 can be configured with processor executable software stored in memory 57 to receive the SMS message, determine its position and report its position without waking the laptop computer 34. In this embodiment, the computer modem 40 (as illustrated in either of FIGS. 5A, 5B) is configured with software that executes in the processor 56 to perform the position determining and reporting functions shown in FIG. 14 without input, other than power, from the laptop computer 34. Since the laptop computer 34 is not activated, an unauthorized user will not be tipped off that its location is being reported. Further, if power is provided to the modem 40 by a back up battery (e.g., a battery (not shown) on the modem 40 itself), the position reporting function may be accomplished even if the laptop computer's battery is removed.

In this alternative embodiment, the modem processor 56 is configured with software to perform the functions illustrated in steps 100-102 and 104-120 of FIG. 14 without waking the computer, step 103. In this embodiment, the LOJACK application resides in the modem memory 57 and is only executed on the modem processor 56. Thus, the modem processor 56 is configured with software to parse the SMS message to recognize that the LOJACK application should be activated, steps 101, 104, and then recall from memory 57 and activate the LOJACK application within the modem processor 56. The modem processor 56 activates the GPS receiver 53 and downloads GPS coordinates, step 118, before formatting and sending a position-reporting message to a destination, steps 119, 120. In one embodiment, the processor 56 is configured with software to send the position-reporting message to a destination e-mail or Internet address via the WiFi transceiver 54. In another embodiment, the processor 56 is configured with software to send the position-reporting message as an SMS message that is sent (via the WiFi transmitter 54) to a destination telephone number. In either case, the destination address (e.g., http address or telephone number) may be stored in memory 57 or included in the SMS message. Thus, in various embodiments, the modem 40 may be configured with processor executable software to: report its position to a particular destination that is stored in memory 57 whenever the LOJACK application is activate; obtain the destination address (e.g., http address or SMS telephone number) from the SMS message payload; or obtain the destination address from the SMS message header (i.e., SMS telephone number). In a further embodiment, the modem 40 may be configured to repeat the steps of downloading GPS coordinates, step 118, and formatting and sending the position reporting message, steps 119, 120, periodically, thereby allowing a receiver to track the position and movement of the computer 26, 34 so long as power continues to be provided to the modem 40.

Providing the LOJACK as a self contained capability within the computer modem 40 allows the position reporting to occur without waking the computer or otherwise generating indications that might alert an unauthorized user. Also, since the power drain of the modem 40 will be much less than an activated computer, this embodiment will permit the LOJACK function to run for a longer time on a given battery charge.

Figure 15:
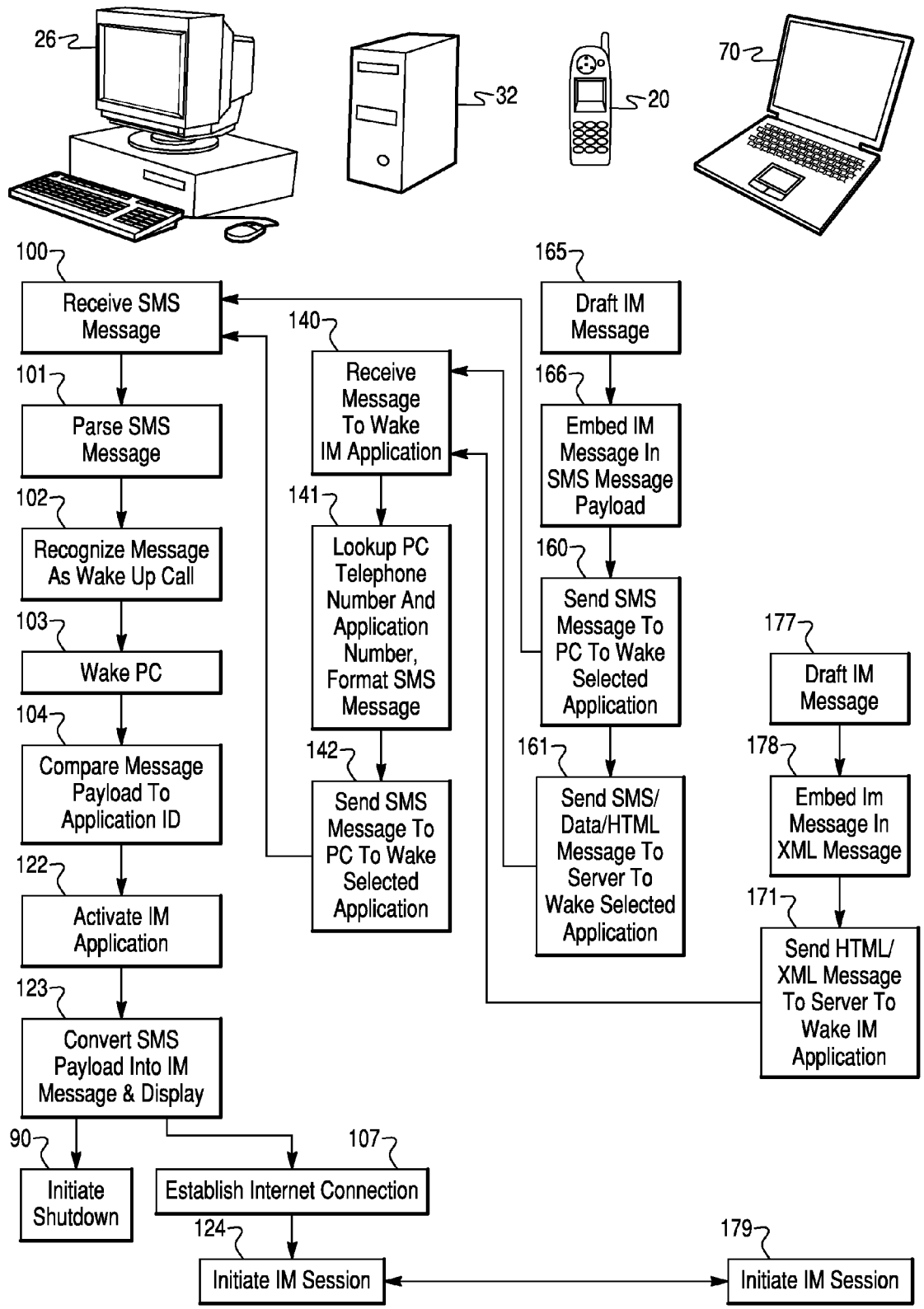
FIG. 15 is a process flow diagram of an embodiment by which a user can initiate an instant messaging (IM) session with a dormant computer.

FIG. 15 illustrates an application in which remote activation of a computer application by a SMS message is used to enable a user to send an instant message (IM) to the computer 26, 34 that does not have its IM application running. This may be a handy way to send an IM or initiate an IM messaging session when the addressee's computer 26, 34 is off or not presently running the IM application.

A user who wants to send an IM message to the remote computer 26, 34 can draft an IM message in the usual manner on a cell phone, step 165. If the user knows that the destination computer 26, 34 is not receiving IM messages, the IM message can be embedded into the payload of an SMS message that is prepared in the cellular telephone 20 such as by means of a cell phone application, step 166. The SMS message is also constructed to include the application identifier for the IM application in the remote computer 26, 34. The SMS message is sent to the remote computer 26, 34 instructing it to initiate the IMF location, step 160.

If the user wants to send an IM from a computer 70, the user can draft the IM message in the usual manner, step 177, after which the computer software can embed the IM message into an email, HTML or XML message, step 178, and send this message to the server 32, step 171. Similarly, the user can send a message from a cellular telephone 20 to the server 32 that includes the IM message to be sent to the computer 26, 34, step 161. The server 32 will process the received request and format an SMS message that is sent to the remote computer 26, 34 in a manner similar to that described above with reference to FIG. 10 (140-142).

When the remote computer 26, 34 receives the SMS message instructing it to activate the IM application, step 100, that message may be processed in a manner similar to the processing of all incoming SMS messages (steps 100-104). When the computer 26, 34 activates the IM application, step 122, the data payload of the SMS message is converted into an IM message which is displayed in the usual manner, step 123. If there are no further communications, the IM application may shut down in the manner described above with reference to FIG. 9, step 90. Alternatively, the computer 26, 34 may establish an Internet connection, step 107, and initiate an IM session with the user, steps 124, 179. This alternative may be useful to allow a user to initiate an IM session with another person whose computer 26, 34 is off or not running the IM application. When the computer turns on and displays the user's IM message, the person will be informed that the user would like to IM, and may take action to establish an Internet connection (e.g., moving to a location where WiFi network service is available).

Figure 16:
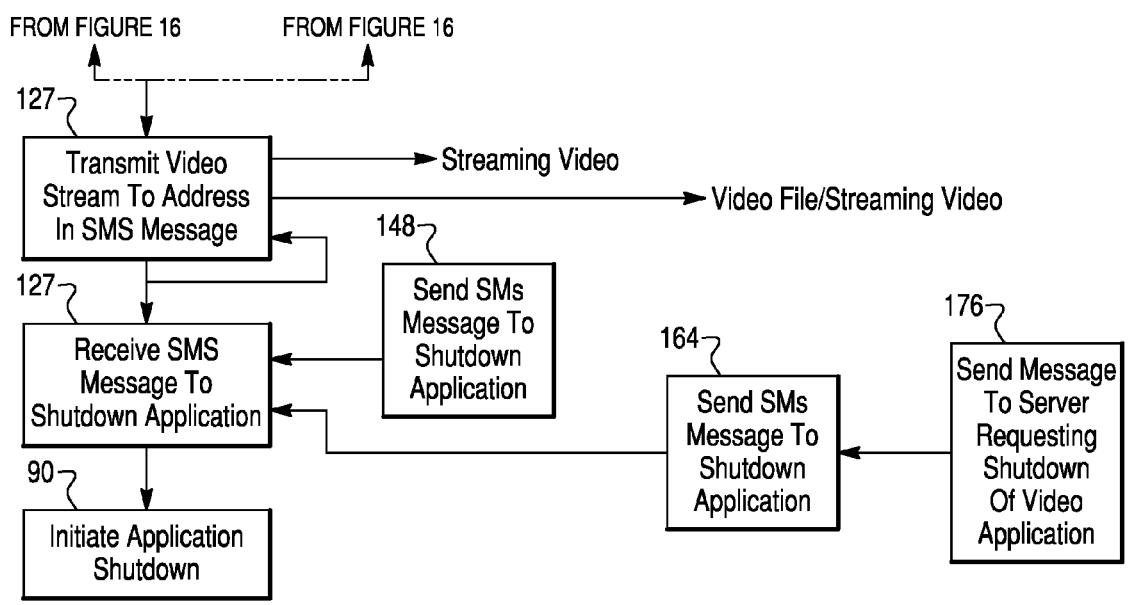
FIG. 16 is a process flow diagram of an embodiment by which a user can activate a video camera connected to a dormant computer.

FIG. 16 illustrates an application in which remote activation of a computer application by a SMS message is used to remotely activate a video camera 260 connected to the remote computer 26 and transmit images to another location, such as the user's cellular telephone 20. This application may be useful for security monitoring purposes, or when the user just wants to check the condition of the user's home but does not want to leave a computer 26, 34 running and/or connected to the Internet.

To activate the video camera application, the user can send an SMS message using any of the techniques described above with reference to FIG. 10 (steps 160, 161, 170, 171, 140-142). Similarly, when the remote computer 26 receives the SMS message, step 100, the message is processed in a manner similar to that described above with reference to FIG. 10 (100-104).

When the computer activates the video cam application, step 125, it may open an Internet connection for sending video to the destination, step 107, and turn on the video camera 260 to begin receiving images, step 126. Depending upon the address included in the SMS message payload, the computer 26, 34 can transmit the received video stream to the user using a variety of file transfer protocols, step 127. For example, the computer 26, 34 may stream the video to the server 32, another computer 70, or directly to the user's cellular telephone 20. Alternatively, segments of video may be recorded in video files which are periodically transmitted to the user such as video file enclosures to e-mail messages. The transmission of video will continue, until the computer 26, 34 is instructed to terminate the video camera application. Such instructions may be included in the payload of the original SMS message, such as a period of time that images should be recorded. Alternatively, the computer 26, 34 may continue transmitting video images until a second SMS message is received instructing the computer to shut down the video application, step 121. The user may send such an SMS message directly from the user's cellular telephone 20, step 164, or from a computer 70 connected to the Internet, step 176, in a manner similar to that described above with reference to FIG. 14. Upon receiving an SMS message instructing the computer 26, 34 to stop the video camera application, the computer 26, 34 may initiate application shutdown following the method described above with reference to FIG. 9, step 90.

Figure 17:
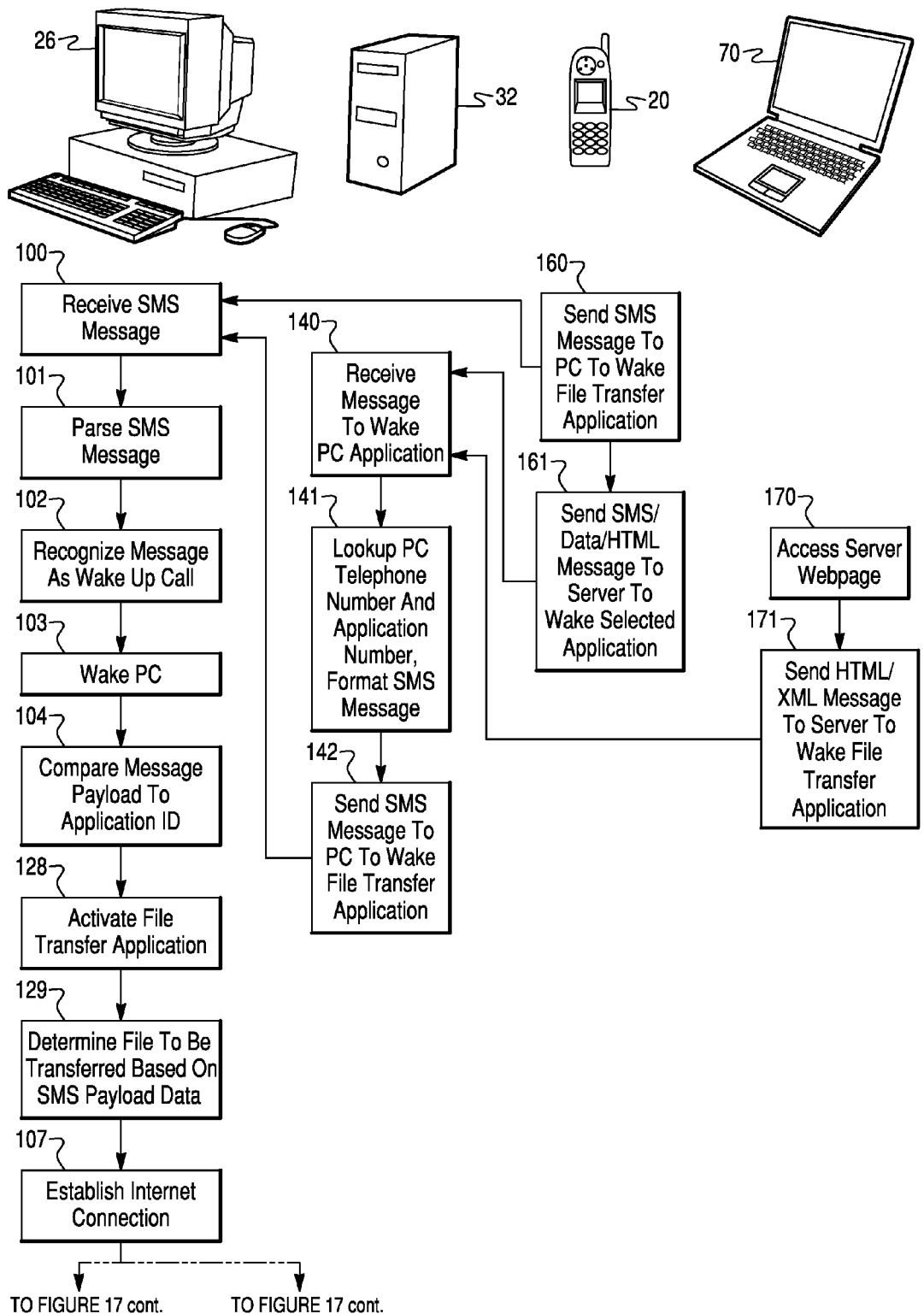
FIG. 17 is a process flow diagram of an embodiment by which a user can download files from a dormant computer.
Figure 17:
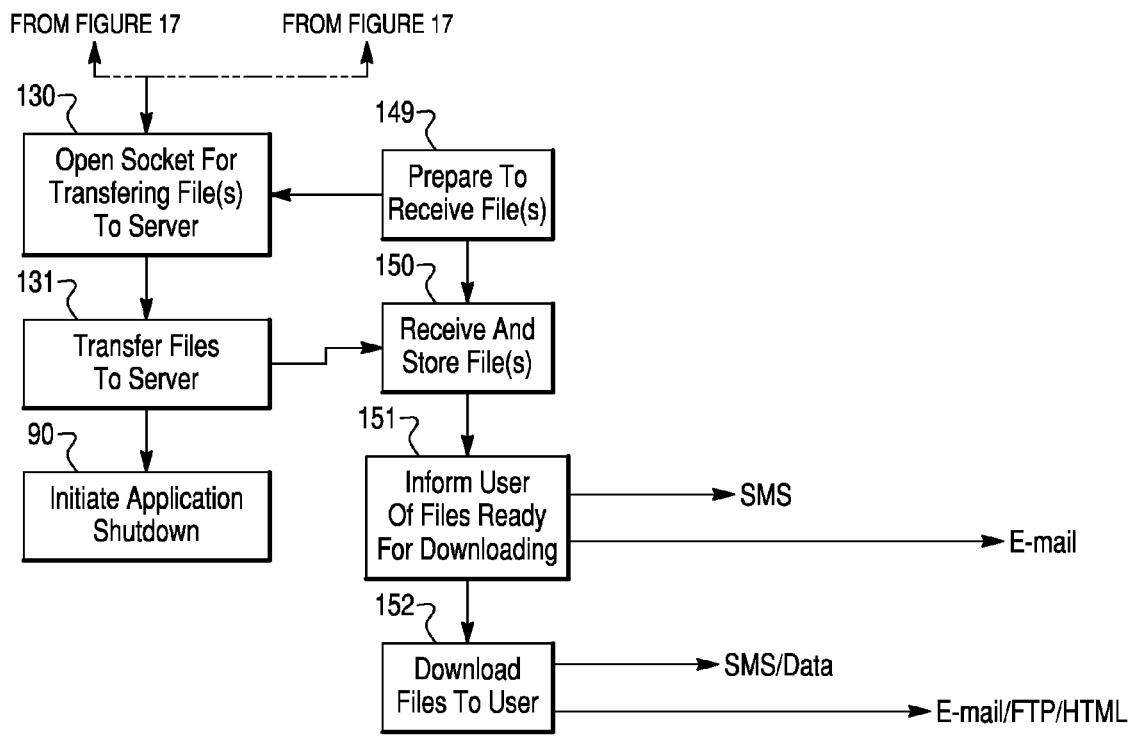

FIG. 17 illustrates an application in which remote activation of a computer application by a SMS message is used to enable the user to download a file from the remote computer 26, 34. This application may be useful when a user desires a copy of a file resident on a remote computer 26, 34 that is not presently running or setup for remote file transfer operations. Using a cellular telephone 20 or a computer 70 connected to the Internet, a user can start the remote computer 26, 34 and have the computer copy the file to a server 32 from which the file can be downloaded to a computer 70 via the Internet or delivered directly to the user's cellular telephone 20.

To activate the file download application, the user can send an SMS message using any of the techniques described above with reference to FIG. 10 (steps 160, 161, 170, 171, 140-142). In doing so, the name of the file to be transferred can be included in the SMS message payload. Similarly, when the remote computer 26, 34 receives the SMS message, step 100, it is processed in a manner similar to that described above with reference to FIG. 10 (steps 100-104).

When the computer 26, 34 activates the file download application, step 125, the application determines the file to be transferred by reading the file name contained in the SMS message payload, step 129. The file name and directory location may be included in the message payload explicitly. Alternatively, only the file name may be included in the payload and the application configured to search the hard disc directory to identify the appropriate directory location for the file. In a third alternative, a file identifier may be provided in the message payload which the computer can use to look up the appropriate file name and directory location in a registry of the data files which have been set up for the file download application.

To download the file, the computer establishes an Internet connection, step 107, and sends an http (or other protocol) message to the server 32 to open a socket for transferring the file to the server, step 130. This process may open a secure socket (SSL) connection to transfer the file in a secure manner. In response to the message from the remote computer 26, 34, the server 32 prepares to receive the file or files, such as by opening a temporary file in memory to receive the data, step 149. The remote computer 26, 34 then transfers the file to the server using an appropriate data transfer protocol, step 131. Once the file transfer is complete, the computer 26, 34 shuts down the file download application, step 90 in the manner described above with reference to FIG. 9.

When the server 32 receives the file or files, it stores the information in a location that can be accessed by the user or used for forwarding to the user, step 150. The server 32 then may inform the user that the file(s) are ready for download, step 151. The server may do so by sending an SMS message to the user's cellular telephone 20 or by sending an e-mail that can be received on a computer 70 or the user's cellular telephone 20. Finally, the server 32 will download the files to the user when so requested, step 152. A user can request download of the transferred file(s) by contacting the server 32, such as by accessing a webpage hosted by the server and clicking on a download activation hyperlink. Download of the file(s) to the user using a computer 70 may be accomplished by e-mail, FTP, HTML, or other data transfer protocol. Download of the file(s) to the user's cellular telephone 20 can be accomplished by SMS message, data transfer, HTML (using a web browser) or other data transfer protocol available over cellular telephone networks.

Figure 18A:
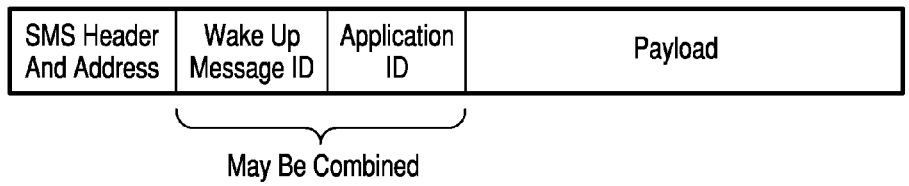
FIGS. 18A through 18C are SMS message content diagrams showing alternative SMS message configurations according to various embodiments.

The various embodiments take advantage of the flexible structure of the SMS message packet which permits the necessary data to be included in a variety of formats. FIG. 18A illustrates one format for the SMS message which includes a symbol indicating that the SMS message is a command to start an application, and an application number (or ID) which informs the computer of the application that is to be started. These data fields may be positioned just after the SMS header and address portion of the SMS message. Following the application identifier field may be additional data related to the application which can be included in the remaining portion of the SMS message payload.

As explained above, the symbol indicates to the computer 26, 34 or its modem 25, 33 that the SMS message is an application activation command (referred to as the "wakeup msg ID" field in the figures.). This symbol may be any recognizable bit pattern in a few bits of the message. Additionally, the "wakeup msg ID" and the application ID fields may be combined into a single value in which the first few bits have the same pattern. Including such a symbol may simplify the design of modem hardware and software which can recognize the SMS message as an activation command. However, the embodiments do not require that such a symbol be included in the SMS message. Instead, the modem, modem driver or computer can be configured to recognize from the application number or other data field that the SMS message is an application activation command. For example, the application number can be used in a data table look up procedure to determine both the nature of the SMS message and the application to be activated. While performing a data table look up procedure on every SMS message received may add complexity, doing so may provide greater flexibility by enabling SMS messages to convey other kinds of commands from remote users, such as shutdown commands (e.g., those described herein with reference to FIGS. 14 and 16), status queries, additional data (e.g., a second SMS message to provide more data for the application to be activated by a first SMS message), etc., all of which could be interpreted based upon the entries in the data table.

Figure 18B:
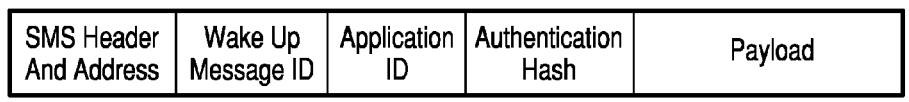

Some embodiments or applications include a message authentication field in the SMS message to permit the computer to confirm that the message has been sent by an unauthorized server or user. FIG. 18B shows a possible configuration for such an SMS message in which an authentication hash is included in the message after the application number ("app. ID") and ahead of the rest of the message payload. The nature of the authentication hash is described more fully below with reference to FIG. 20. When a computer 26, 34 receives an SMS message as shown in FIG. 18B, the authentication hash is used in combination with the application number (or some other value known to the remote computer 26, 34 and server 32) to authenticate the message. If the message is authenticated, then the identified application is started and data in the remaining payload portion is used by the application.

In some applications, there will be a need to also authenticate the user to confirm that an authorized user has requested the action. For instance, as explained above with reference to FIG. 13, before the cyanide application is started the computer may be configured to confirm that the action is being requested by the authorized user, and not by a hacker or by accident. In such cases, user authentication data may be included in the message payload shown in FIGS. 18A and 18B. Such user authentication may be a username and password combination, or some other form of authentication.

Figure 18C:
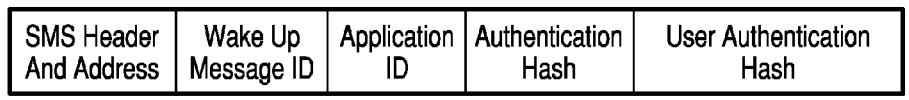

FIG. 18C illustrates another example of how user authentication information can be included in the SMS message. In this example, the user authentication information is provided in the form of a hash created by the user credentials and an encryption key. Since the username and password may be known to the computer along with the encryption key, the computer can compare the received user authentication hash to a hash generated from this internal information to confirm that an authorize user has sent the SMS message.

Figure 19A:
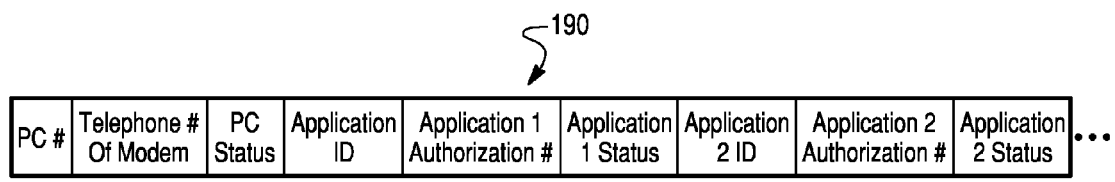
FIGS. 19A and 19B are example data structures useful with various embodiments.

In order for the server 32 to provide the services described above for the various embodiments and applications, the server 32 may maintain a database of information regarding remote computers, and their applications to be remotely initiated by SMS messages. Any combination of data structures and fields may be used to store such information. For example, FIG. 19A shows a data structure in which each record contains a key such as an identifier of the computer, and all of the necessary information in a series of data fields. These data fields may include, for example, the SMS receiver telephone number, the status of the computer (on or off), the ID of the first application, an authentication value for the first application, the status of the first application, the ID of the second application, etc. To generate an SMS message, the server 32 simply recalls the data record for the indicated remote computer (such as by recalling the data record keyed to the computer number) and selects the necessary data from the appropriate data fields, such as the application ID and application authorization number.

Figure 19B:
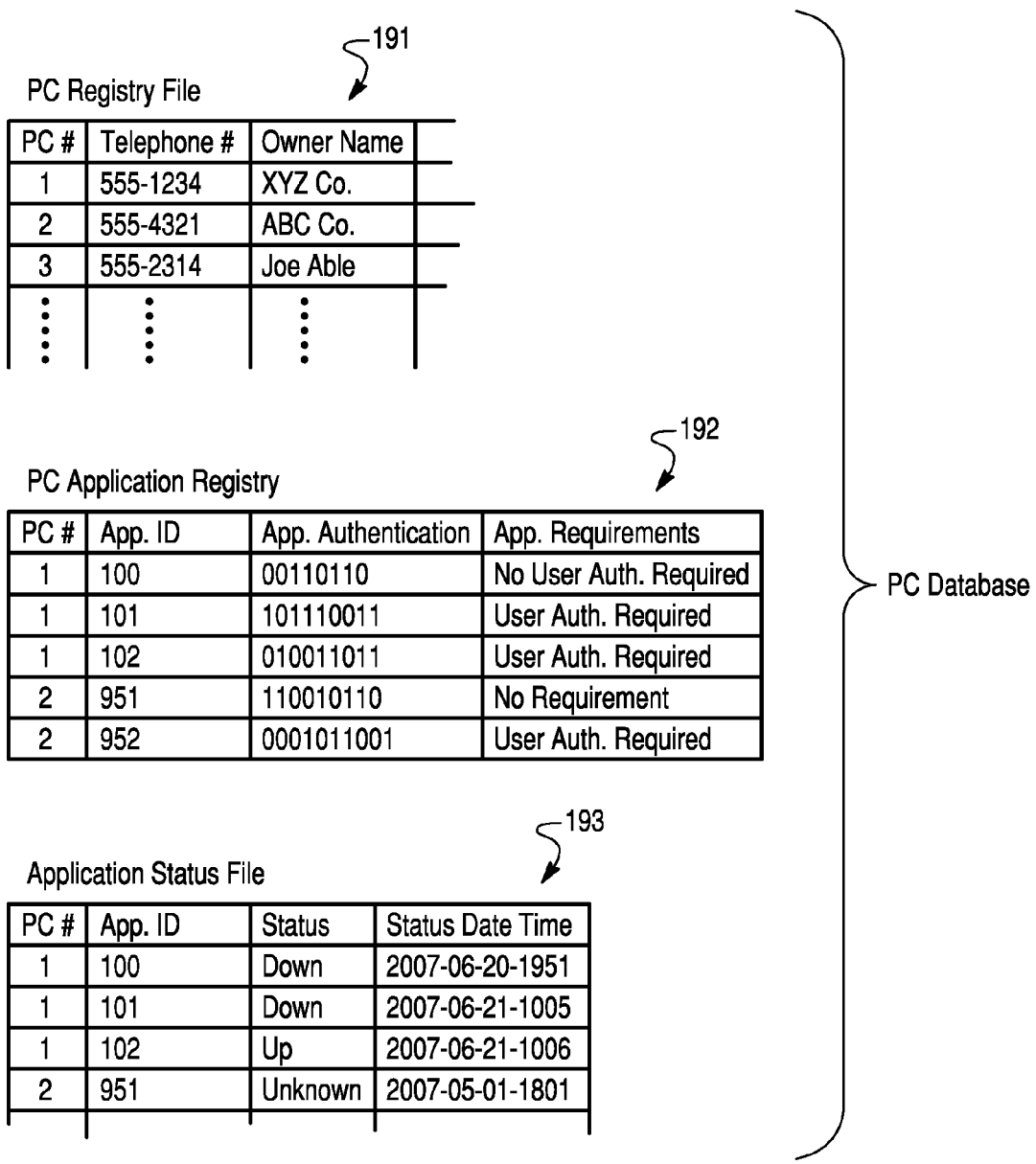

As another example, the server can maintain a database comprising a number of separate but cross-correlated data tables in order to efficiently track the status and critical data for each computer and application registered for SMS startup. FIG. 19B illustrates an example database structure for such purposes. This data structure may include a computer registry file 191, a computer application registry 192, and application status file 193.

A computer registry file 191 may be used to record information that is unique to each computer registered for SMS activation services, such as a key or computer number, its SMS receiver telephone number, and information regarding the owner of the computer or of the purchaser of the SMS startup services. In this example, the number of the remote computer is used as the independent key correlating data records throughout the database.

In order to keep track of all the applications registered for SMS startup, a computer application registry 192 may be included in the database. This data record or data table includes a record for each application in each application registered for SMS startup. The computer number provides the independent key for relating each application to its associated computer, so the combination of the computer number (or key) and the application number is unique within the database. Each application record includes information necessary to start the associated application, such as the application authentication value and information regarding any special requirements that must be implemented when formulating the SMS message. For example, some applications may require user authentication, while other applications do not.

Also shown in FIG. 19B is an application status file 193 which the server 32 can maintain to record the current status of each computer 26, 34 and application registered for SMS startup. This status may be maintained as a simple "1" (operating) or "0" (shutdown) status flag, or a more complete description of status. Other fields may record additional data related to application and computer status, such as the last date that status information was reported to the server. The server 32 can maintain the record of the computer applications status by recording status entries whenever the remote computer reports that it is about to shut down an application for itself as described above with reference to FIG. 9.

Figure 20:
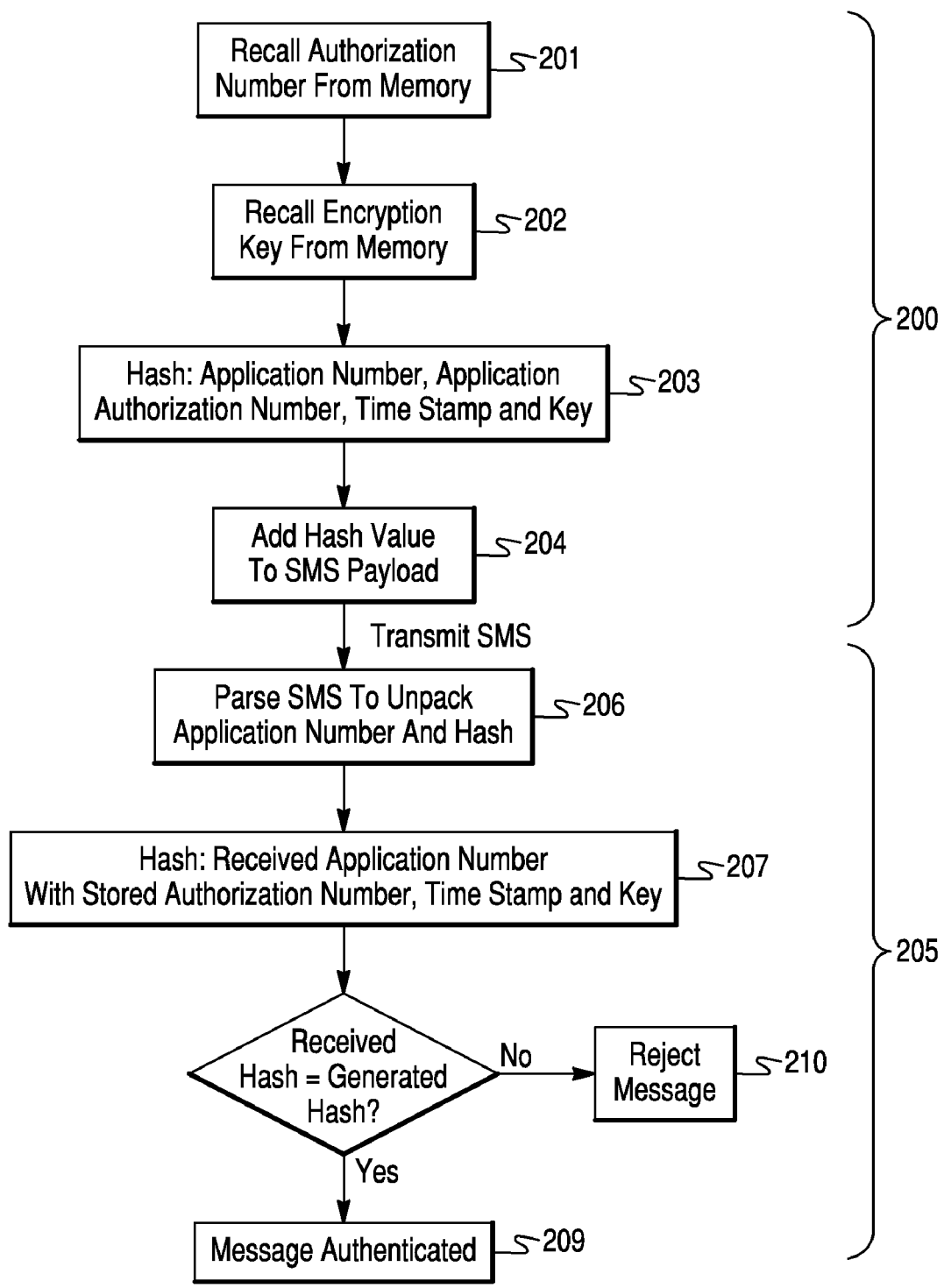
FIG. 20 is a process flow diagram of an example message authentication technique according to an embodiment.

A number of known techniques can be used for authenticating SMS messages to the receiving computer 26, 34. FIG. 20 illustrates an example method involving the generation of an authentication hash in the server 32 or cellular telephone 20, step 200, which can be compared in the computer 26, 34 to authenticate the message, step 205. By confirming a match of the received to the generated hash, the computer 26, 34 is able to confirm that the SMS message has been properly received and was produced by unauthorized user or server.

In the portion of the method performed in the server or cell phone, the server 32 or cellular telephone 20 recalls the application authentication value from memory, such as from the appropriate field of a data record illustrated in FIG. 19A or 19B, step 201. The server 32 or cellular telephone 20 also recalls an encryption key from memory, step 202. The encryption key may be different for each computer registered for SMS startup services and/or each application registered for SMS startup services. Also, in order to defeat "replay attacks," a time stamp (or other random, nonrepeating unique identifier) may be included in some embodiments to allow the receiver to distinguish a redundant message. In such embodiments, the present date and time (e.g., down to the hour or minute) may also be recalled from memory as part of recalling the application authentication value or encryption key, steps 201, 202. In such embodiments, the combination of the application authentication value and the timestamp (or random unique number) provides a non-repeating authentication value that can be used to authenticate the message using the method illustrated in FIG. 20.

Using the application number (or other data), application authentication value, time stamp or random unique (i.e., used only once) number (in some embodiments) and the appropriate encryption key, the computer generates a hash of these values using any known encryption hashing algorithm, step 203. This hash value is then added to the SMS payload, such as illustrated in FIG. 18B or 18C, step 204.

When the SMS message is received by the remote computer 26,34, the computer (or the modem or the modem driver) will unpack the application number and hash value when the message is parsed, step 206. The computer (or modem or modem driver) then generates its own hash employing the same hashing algorithm using the received application number, the date/time of receipt and a stored authentication number and encryption key as inputs, step 207. In embodiments in which a random unique number is separately transmitted by the sender, the computer recalls the previously received number and uses that value in the hashing algorithm. The computer (or the modem or the modem driver) then compares the received hash to the generated hash, step 208. If the two hash values match, then the message is authenticated, step 209. However, if the two hash values do not match, this indicates that there is something wrong with the SMS message or the user or server that generated the message, and accordingly the computer 26, 34 may reject or ignore it, step 210. The use of a unique or time stamp value in the hash also allows the computer 26, 34 to reject or ignore "replay attacks" since the replayed SMS message will contain a hash value based upon an incorrect timestamp or previously used random unique number.

Figure 21:
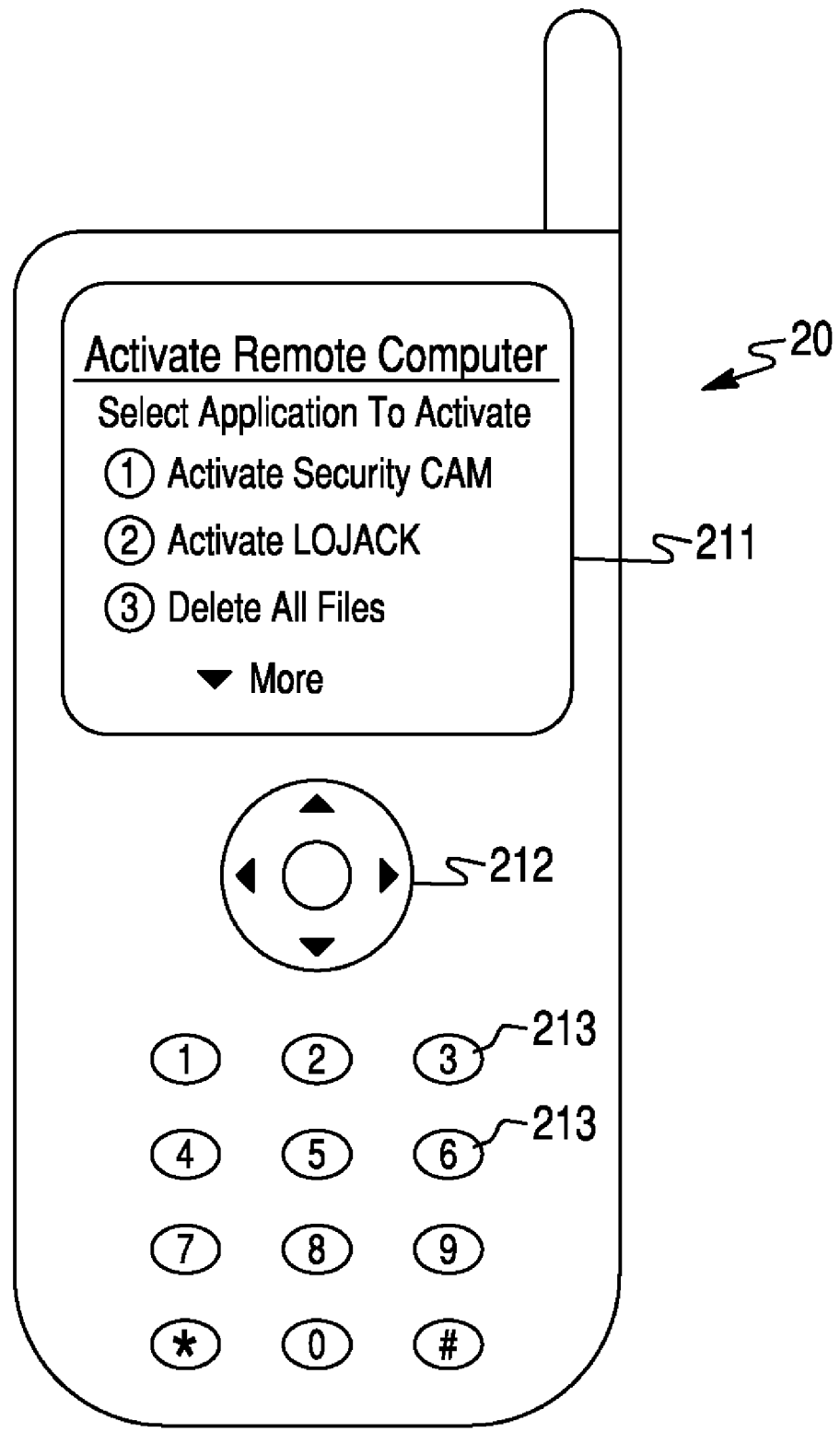
FIG. 21 is a perspective illustration of a cell phone with a menu displayed for a cell phone application for remotely activating a computer program according to embodiment.

As explained above, the server 32 is not required in all embodiments since the SMS message can be sent directly from the user's cellular telephone 20. In order to enable embodiments in which there is no server 32, a cell phone application may be used to track or record the application number, application authentication value and other information required for generating SMS activation messages. Additionally, a cellular telephone application can be configured to provide a simple user interface so the user does not have to enter the SMS message data directly. For example, FIG. 21 illustrates a cellular telephone 20 with an application display 211 which enables the user to remotely activate a computer application by making a menu selection. In this example, three software applications are shown on the display that can be activated remotely simply by pressing a menu actuator 212 or a cellular telephone button 213.

Figure 22:
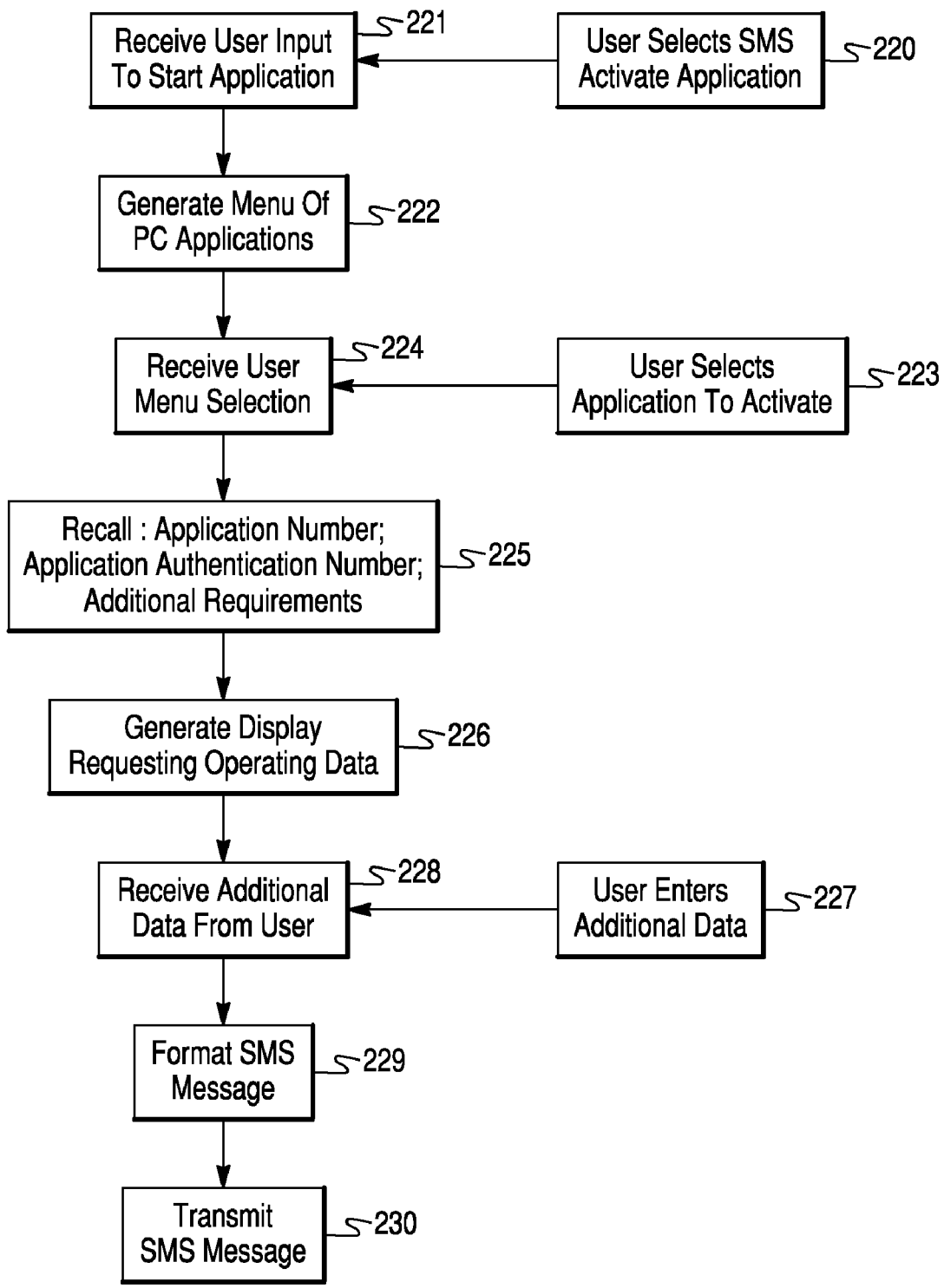
FIG. 22 is a process flow diagram of a cell phone application for remotely activating a computer program according to embodiment.

An example cell phone remote activation application is illustrated in FIG. 22. This application may be configured in the cell phone software architecture so that it appears on the phone's root application menu, allowing it to be activated by a user by selecting the application using a menu actuator 212, steps 220 and 221. In response, the cell phone remote activation application generates a menu of remote computer applications that may be activated from the cell phone, step 222. The user selects a desired application from the menu, such as by pressing a button on the cellular telephone 20, step 223. The cell phone application receives this user selection, step 224, and recalls from memory the data associated with the selected computer application, including for example the application number, application authentication value and any additional requirements, step 225. If the selected computer application requires additional user input, such as the entry of a username and password to authenticate the user, a supplemental input display may be generated on the cell phone, step 226. The user enters the additional data using the cell phone buttons, step 227, the inputs of which are received by the cell phone application software, step 228. Then, using the data pulled from memory, and optionally the authentication credentials entered by the user, the cell phone application formats the SMS message, step 229. Finally, the cell phone 20 transmits the SMS message to the remote computer 26, 34 using standard SMS message transfer methods, step 230.

Such a cell phone application may be built into the cell phone's memory, may be downloaded from application servers, may be loaded from software installed on the computer to be remotely controlled (e.g., part of software installed on the remote computer), or downloaded from an SMS activation service provider server 32, such as upon signing up for SMS activation services.

In each of the foregoing embodiments, the functionality of the cell phone 20, server 32 and remote computer 26, 32 may be provided in software. Such software may be stored and distributed or otherwise reside on any computer readable medium, such as hard disc drives, read only compact discs, pre-programmed memory chips (such a cellular telephone SIM chip), random access memory, etc. Also, such software may be transmitted over networks or wirelessly in the form of electrical or electromagnetic signals which can be understood by a modem or computer in order to receive the software for use or storage.

The hardware used to implement the steps of the forgoing embodiment methods may be processing elements and memory elements configured to execute a set of instructions, wherein the set of instructions are for performing method steps corresponding to the above described events. Alternatively, some events may be performed by circuitry that is specific to a given function. For example, the generation of an authentication hash may be performed by linear feedback shift registers and adders configured to implement hashing functions or other encryption algorithms.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for activating a computer based application, comprising:
   receiving a Short Message Service (SMS) message at a modem connected to a computer;
   parsing the SMS message by the modem;
   determining, by the modem, whether the SMS message contains instructions to activate the computer;
   determining, by the modem, whether the computer is presently off;
   sending a start signal from the modem to the computer to cause the computer to start and to initiate a boot sequence in response to determining that the SMS message contains instructions to activate the computer and that the computer is presently off;
   determining from data in the SMS message that an application is to be started;
   comparing an application identifier in the SMS message to identifiers of applications available in the computer to determine which application is to be started;
   determining whether a processor of the computer is ready to receive data; and
   activating the application identified by the application identifier in response to determining that the processor of the computer is ready to receive data.

2. The method of claim 1, further comprising authenticating the SMS message by comparing a transmitted authentication value in the SMS message to a stored authentication value in memory of the computer, wherein activating the application occurs only if the SMS message is authenticated.

3. The method of claim 1, further comprising authenticating the SMS message by:
   generating an authentication hash based upon the application identifier in the SMS message, a stored authentication value in memory and an encryption key; and
   comparing the generated authentication hash to a transmitted authentication value in the SMS message, wherein activating the application occurs only if the SMS message is authenticated.

4. The method of claim 1, further comprising providing data in the SMS message to the activated application.

5. The method of claim 1, wherein sending a start signal from the modem to the computer to cause the computer to start and to initiate a boot sequence further comprises sending the start signal to an additional lead connected to a startup signal lead within the computer.

6. The method of claim 1, wherein determining whether the processor of the computer is ready to receive data comprises monitoring a flag in computer memory which the processor of the computer sets when the boot sequence is complete.

7. A computer capable of remote activation by a user sending a Short Message Service (SMS) message, comprising:
   a processor; and
   a modem comprising an SMS receiver, wherein the modem is configured to receive an SMS message, parse the SMS message, determine whether the SMS message contains instructions to activate the processor, determine whether the processor is presently off, send a start signal to cause the processor to start and to initiate a boot sequence in response to determining that the SMS message contains instructions to activate the processor and that the processor is presently off, determine from data in the SMS message that an application is to be started, compare an application identifier in the SMS message to identifiers for applications available in the processor to determine which application is to be started, determine whether the processor of the computer is ready to receive data, and activate the application identified by the application identifier in response to determining that the processor of the computer is ready to receive data.

8. The computer of claim 7, wherein the modem is further configured to authenticate the SMS message by comparing a transmitted authentication value in the SMS message to a stored authentication value in memory of the modem, wherein activating the application occurs only if the SMS message is authenticated.

9. The computer of claim 7, wherein the processor is further configured to authenticate the SMS message by comparing a transmitted authentication value in the SMS message to a stored authentication value in memory of the computer, wherein activating the application occurs only if the SMS message is authenticated.

10. The computer of claim 7, wherein the modem is further configured to authenticate the SMS message by:

generating an authentication hash based upon the application identifier in the SMS message, a stored authentication value in memory and an encryption key; and comparing the generated authentication hash to a transmitted authentication value in the SMS message, wherein activating the application occurs only if the SMS message is authenticated.

11. The computer of claim 7, wherein the modem is further configured to authenticate the SMS Message by:

generating an authentication hash in the modem based upon the application identifier in the SMS message, a stored authentication value in modem memory and an encryption key; and comparing the generated authentication hash to a transmitted authentication value in the SMS message, wherein startup of the computer occurs only if the SMS message is authenticated.

12. The computer of claim 7, wherein the computer is further configured to provide data in the SMS message to the activated application.

13. A computer capable of remote activation by a user sending a Short Message Service (SMS) message, comprising:

a modem connected to the computer;

means for receiving a SMS message at the modem;

means for parsing the SMS message;

means for determining, by the modem, whether the SMS message contains instructions to activate the computer;

means for determining, by the modem, whether the computer is presently off;

means for sending a start signal from the modem to the computer to cause the computer to start and to initiate a boot sequence in response to a determination by the means for determining that the SMS message contains instructions to activate the computer and to a determination by the means for determining that the computer is presently off;

means for determining that an application is to be started based on data in the SMS message;

means for comparing an application identifier in the SMS message to identifiers for applications available in the computer to determine which application is to be started;

means for determining whether a processor of the computer is ready to receive data; and means for starting the application identified by the application identifier in response to a determination by the means for determining that an application is to be started.

14. The computer of claim 13, further comprising means for authenticating the SMS message by comparing a transmitted authentication value in the SMS message to a stored authentication value in memory of the computer, wherein activating the application occurs only if the SMS message is authenticated.

15. The computer of claim 13, further comprising:

means for generating an authentication hash based upon the application identifier in the SMS message, a stored authentication value in memory and an encryption key; and means for comparing the generated authentication hash to a transmitted authentication value in the SMS message, wherein the means for starting the application is configured to receive a signal from the means for comparing the generated authentication hash to a transmitted authentication value in the SMS message.

16. The computer of claim 13, further comprising means for providing data in the SMS message to the activated application.

17. A non-transitory computer readable storage medium having stored therein computer executable instructions which will cause a computer modem to:

receive a Short Message Service (SMS) message;

parse the SMS message;

determine whether the SMS message contains instructions to activate a computer that is connected to the computer modem;

determine whether the computer is presently off;

send a start signal to the computer to cause the computer to start and to initiate a boot sequence in response to the determination that the SMS message contains instructions to activate the computer and the determination that the computer is presently off;

determine from data in the SMS message that an application is to be started;

compare an application identifier in the SMS message to identifiers for applications available in the computer to determine which application is to be started;

determine whether a processor of the computer is ready to receive data; and activate the application identified by the application identifier in response to determining that the processor of the computer is ready to receive data.

18. The non-transitory computer readable medium of claim 17, wherein the computer instructions stored therein will further cause the computer modem to authenticate the SMS message by comparing a transmitted authentication value in the SMS message to a stored authentication value in memory of the computer.

19. The non-transitory computer readable medium of claim 17, wherein the computer instructions stored therein will further cause the computer modem to authenticate the SMS message by:

generating an authentication hash based upon the application identifier in the SMS message, a stored authentication value in memory and an encryption key; and comparing the generated authentication hash to a transmitted authentication value in the SMS message.

20. The non-transitory computer readable medium of claim 17, wherein the computer instructions stored therein will further cause the computer modem to provide data in the SMS message to the activated application.

* * * * *